United States Patent
Imaji et al.

(10) Patent No.: US 10,573,891 B2
(45) Date of Patent: Feb. 25, 2020

(54) CARBON MATERIAL FOR NONAQUEOUS ELECTROLYTE SECONDARY BATTERY AND METHOD FOR MANUFACTURING SAME, AND NEGATIVE ELECTRODE USING CARBON MATERIAL AND NONAQUEOUS ELECTROLYTE SECONDARY BATTERY

(71) Applicant: KURARAY CO., LTD., Kurashiki-shi, Okayama (JP)

(72) Inventors: Makoto Imaji, Tokyo (JP); Kenta Aoki, Tokyo (JP); Yasuhiro Tada, Tokyo (JP); Naohiro Sonobe, Tokyo (JP); Junichi Arima, Bizen (JP); Kenichi Koyakumaru, Bizen (JP); Hideharu Iwasaki, Kurashiki (JP); Kiyoto Otsuka, Bizen (JP); Jiro Masuko, Tokyo (JP); Hajime Komatsu, Tokyo (JP); Shinya Tago, Bizen (JP)

(73) Assignee: KURARAY CO., LTD., Kurashiki-Shi (JP)

(*) Notice: Subject to any disclaimer, the term of this patent is extended or adjusted under 35 U.S.C. 154(b) by 196 days.

(21) Appl. No.: 15/409,242

(22) Filed: Jan. 18, 2017

(65) Prior Publication Data
US 2017/0125811 A1   May 4, 2017

Related U.S. Application Data

(62) Division of application No. 14/424,723, filed as application No. PCT/JP2013/073348 on Aug. 30, 2013, now abandoned.

(30) Foreign Application Priority Data

| Aug. 30, 2012 | (JP) | 2012-190703 |
| Aug. 30, 2012 | (JP) | 2012-190704 |
| Aug. 30, 2012 | (JP) | 2012-190706 |
| Aug. 30, 2012 | (JP) | 2012-190707 |

(51) Int. Cl.
| H01M 4/587 | (2010.01) |
| C01B 32/05 | (2017.01) |
| H01M 4/583 | (2010.01) |
| H01M 10/05 | (2010.01) |
| H01M 10/0525 | (2010.01) |
| H01M 4/02 | (2006.01) |

(52) U.S. Cl.
CPC ........... *H01M 4/587* (2013.01); *H01M 4/583* (2013.01); *H01M 10/05* (2013.01); *H01M 10/0525* (2013.01); *C01P 2002/72* (2013.01); *C01P 2006/10* (2013.01); *C01P 2006/12* (2013.01); *C01P 2006/40* (2013.01); *C01P 2006/80* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| 5,093,216 | A | 3/1992 | Azuma et al. |
| 5,340,670 | A | 8/1994 | Takami et al. |
| 5,451,477 | A | 9/1995 | Omaru et al. |
| 5,587,255 | A | 12/1996 | Sonobe et al. |
| 5,616,436 | A | 4/1997 | Sonobe et al. |
| 5,741,472 | A | 4/1998 | Sonobe et al. |
| 5,772,974 | A | 6/1998 | Ohashi et al. |
| 5,985,489 | A | 11/1999 | Ohsaki et al. |
| 6,245,461 | B1 | 6/2001 | Smith et al. |
| 6,303,249 | B1 | 10/2001 | Sonobe et al. |
| 6,335,122 | B1 | 1/2002 | Yamada et al. |
| 6,475,461 | B1 | 11/2002 | Ohsaki et al. |
| 7,718,307 | B2 | 5/2010 | Shimizu et al. |
| 7,858,239 | B2 | 12/2010 | Shimizu et al. |
| 9,327,978 | B2 | 5/2016 | Haga et al. |
| 2003/0068552 | A1 | 4/2003 | Anglin et al. |
| 2007/0009418 | A1 | 1/2007 | Kobayashi et al. |
| 2007/0287068 | A1 | 12/2007 | Shimizu et al. |
| 2009/0126172 | A1 | 5/2009 | Kobayashi et al. |

FOREIGN PATENT DOCUMENTS

| CA | 2197858 A1 | 1/1997 |
| CA | 2250719 A1 | 4/1999 |

(Continued)

OTHER PUBLICATIONS

Chinese Office Action, dated Jul. 3, 2017, for Chinese Application No. 201380044836.5, with an English translation.

(Continued)

*Primary Examiner* — Wojciech Haske
(74) *Attorney, Agent, or Firm* — Birch, Stewart, Kolasch & Birch, LLP

(57) ABSTRACT

The object of the present invention is to provide a carbonaceous material which is obtainable from plant-derived char and has a decreased specific surface area. Further, the object of the present invention is to provide a non-aqueous electrolyte secondary battery having excellent dedoping capacity, non-dedoping capacity, and charge-discharge efficiency. The object can be solved by a carbonaceous material for non-aqueous electrolyte secondary batteries characterized in that the carbonaceous material is obtained by heat-treating plant-derived char which is demineralized in gas-phase, and carbon precursor or volatile organic compound under a non-oxidizing gas atmosphere; and a specific surface area determined by a BET method is 10 m$^2$/g or less.

10 Claims, 3 Drawing Sheets

(56) References Cited

FOREIGN PATENT DOCUMENTS

| | | |
|---|---|---|
| CN | 1255244 A | 5/2000 |
| CN | 1846322 A | 10/2006 |
| CN | 1947286 A | 4/2007 |
| EP | 0 573 266 A1 | 12/1993 |
| EP | 0 646 978 A1 | 4/1995 |
| EP | 0 767 505 A1 | 4/1997 |
| EP | 0 767 505 B1 | 5/1999 |
| EP | 1 288 160 A1 | 3/2003 |
| EP | 1 739 771 A1 | 1/2007 |
| EP | 2 624 345 A1 | 8/2013 |
| JP | 4-338106 A | 11/1992 |
| JP | 7-230803 A | 8/1995 |
| JP | 8-64207 A | 3/1996 |
| JP | 8-112539 A | 5/1996 |
| JP | 9-161801 A | 6/1997 |
| JP | 9-293507 A | 11/1997 |
| JP | 10-21919 A | 1/1998 |
| JP | 2828509 B2 | 11/1998 |
| JP | 11-135108 A | 5/1999 |
| JP | 3719790 B2 | 11/2005 |
| JP | 2006-86011 A | 3/2006 |
| JP | 2006-188366 A | 7/2006 |
| JP | 2008-282547 A | 11/2008 |
| KR | 10-2007-0001212 A | 1/2007 |
| WO | WO 96/30318 A1 | 10/1996 |
| WO | WO 97/01192 A1 | 1/1997 |
| WO | WO 2005/027242 A1 | 3/2005 |
| WO | WO 2005/098999 A1 | 10/2005 |
| WO | WO 2011/157013 A1 | 12/2011 |
| WO | WO 2012/043666 A1 | 4/2012 |
| WO | WO 2013/111595 A1 | 8/2013 |

OTHER PUBLICATIONS

U.S. Office Action issued in U.S. Appl. No. 14/654,619 dated Aug. 30, 2017.
Chinese Office Action and English translation thereof, dated Feb. 4, 2017, for Chinese Application No. 201380044836.5.
European Office Action, dated Feb. 9, 2017, for European Application No. 13833845.4.
Chinese Office Action dated Dec. 4, 2017, for corresponding Chinese Application No. 201380044836.5, including an English translation.
European Office Action dated Oct. 27, 2017, for corresponding European Application No. 13833845.4.
Chinese Office Action and Search Report, dated Aug. 31, 2016, for Chinese Application No. 201480006853.4, with English translations.
Extended European Search Report, dated Aug. 8, 2016, for European Application No. 14754252.6.
International Search Report (form PCT/ISA/210), dated Jun. 3, 2014, for International Application No. PCT/JP2014/053862, with an English translation.
Korean Office Action dated Oct. 12, 2016, for Korean Application No. 10-2015-7023925, with an English translation.
U.S. Office Action, dated May 4, 2017, for U.S. Appl. No. 14/654,619.
International Search Report issued in PCT/JP2013/073348, dated Oct. 8, 2013.
Written Opinion of the International Searching Authority issued in the corresponding International Application No. PCT/JP2013/073348 dated Oct. 8, 2013.
Chinese Office Action, dated Sep. 5, 2016, for Chinese Application No. 201380044836.5, as well as an English translation.
European Search Report, dated Mar. 15, 2016, for European Application No. 13833845.4.
Notification of the First Office Action (including an English translation thereof) issued in the corresponding Chinese Patent Application No. 201380044836.5 dated Dec. 3, 2015.
U.S. Office Action issued in U.S. Appl. No. 14/654,619 dated Apr. 4, 2018.
Chinese Office Action, dated May 15, 2017, for Chinese Application No. 201480006853.4, with an English translation.
U.S. Office Action for U.S. Appl. No. 14/654,619, dated Mar. 27, 2019.

CARBON MATERIAL FOR NONAQUEOUS ELECTROLYTE SECONDARY BATTERY AND METHOD FOR MANUFACTURING SAME, AND NEGATIVE ELECTRODE USING CARBON MATERIAL AND NONAQUEOUS ELECTROLYTE SECONDARY BATTERY

CROSS-REFERENCE TO RELATED APPLICATIONS

This application is a Divisional of co-pending application Ser. No. 14/424,723 filed on Feb. 27, 2015, which is a National Phase of PCT International Application No. PCT/JP2013/073348 filed on Aug. 30, 2013, which claims priority under 35 U.S.C. § 119(a) to Patent Application Nos. 2012-190703, 2012-190704, 2012-190706, and 2012-190707 each filed in Japan on Aug. 30, 2012. All of the above applications are hereby expressly incorporated by reference into the present application.

TECHNICAL FIELD

The present invention relates to a carbonaceous material for a non-aqueous electrolyte secondary battery and a method for manufacturing the same. Further, the present invention relates to a negative electrode containing the carbonaceous material for a non-aqueous electrolyte secondary battery, and a non-aqueous electrolyte secondary battery. According to the present invention, a carbonaceous material for a non-aqueous electrolyte secondary battery capable of preparing a non-aqueous electrolyte secondary battery having excellent dedoping capacity (discharge capacity), non-dedoping capacity(irreversible capacity), and efficiency can be provided.

BACKGROUND ART

Lithium-ion secondary batteries are widely used for small-size portable instruments such as cellular phones and laptop computers. A non-graphitizable carbon can be doped and dedoped with a large amount of lithium, which is more than a theoretical capacity of graphite, i.e. 372 mAh/g. Further, the non-graphitizable carbon exhibits excellent input/output performances, cycle durability, and low-temperature property, and thus it is developed and used as a negative electrode material of a lithium-ion secondary battery (Patent literature 1).

In recent years, the lithium-ion secondary batteries have been developed for vehicles, and have been in practical use, in response to increasing concern over environmental issues. In the use thereof for vehicles, the input/output performances, cycle durability, and low-temperature property are required in addition to a large doping and dedoping capacity (i.e. charge-discharge capacity). The non-graphitizable carbon is superior in terms of the above characteristics, and thus suitable therefor.

The non-graphitizable carbon can be obtained by using petroleum pitch or coal pitch, phenol resin, or a plant-derived, organic substance as a carbon source. Among these carbon sources of the non-graphitizable carbon, the plant-derived organic substance can be cultivated, and thus it is a sustainable material. Further, the plant-derived organic substance can be stably supplied at a cheap price. Furthermore, a carbonaceous, negative electrode material obtained by heat-treating the plant-derived organic substance has a large amount of pores, and thus it is expected to have a large charge-discharge capacity (Patent literatures 1 and 2).

However, the carbonaceous material obtained from the plant-derived, organic substance has a large amount of pores, and thus shows a tendency to have a large specific surface area. Further, the plant-derived, organic substance has minerals. However, metallic impurities are harmful to the battery, and therefore it is required to preliminarily remove the minerals. Furthermore, according to the study of the inventors, it is known that pores are occluded by the minerals, and therefore potential charge-discharge capacity cannot be obtained.

CITATION LIST

Patent Literature

[Patent literature 1] Japanese Unexamined Patent Publication (Kokai) No. 9-161801
[Patent literature 2] Japanese Unexamined Patent Publication (Kokai) No. 10-21919

SUMMARY OF INVENTION

Technical Problem

In addition, when the plant-derived, organic substance is used as the carbonaceous material of negative electrodes, an increase in the carbonization level is required. Further, a demineralizing treatment is required, in order to remove minerals such as potassium, silica, alumina, and other inorganic impurities which occlude pores contributing to lithium doping. Conventionally, a demineralizing treatment in the liquid-phase was used as a demineralizing treatment (Patent literature 2).

Patent literature 2 discloses that a demineralization rate is remarkably reduced in the case where materials to be treated have large particle diameters at the time of demineralization in the liquid-phase, and thus the particle diameter of the carbonaceous material is preferably 100 μm or less. In fact, a carbonaceous material precursor having a particle diameter of 25 μm is used in the Example of Patent literature 2. The inventors of the present invention prepared carbonaceous material for a negative electrode of non-aqueous electrolyte secondary batteries having an average particle diameter of 19 μm, using demineralization in the liquid-phase described in Patent literature 2. In the demineralization in the liquid-phase, it is necessary to remove a mineral-eluted solution by filtration. (The term "mineral" used herein means substances containing elements other than carbon, hydrogen, oxygen, and nitrogen, which are contained in carbon sources of the carbonaceous material for negative electrodes or contaminated in the manufacturing process.) However, if the average particle diameter becomes smaller, it takes washing water a long time to pass through a tank wherein carbon materials are filled at the time of filtration. Thus, it is very difficult to efficiently remove the solution in a short time. Even if the solution can be removed, the obtained products are expensive. Thus, for practical purpose, it is difficult to industrially-produce the carbonaceous material with a small average particle diameter for a negative electrode of non-aqueous electrolyte secondary batteries by using demineralization in the liquid-phase.

The inventors have conducted intensive studies into a demineralization method which can be used industrially in the method for manufacturing a plant-derived, carbonaceous material for a negative electrode, and as a result, surprisingly found that potassium can be removed by heating the plant-derived char in an inert gas atmosphere containing a halogen compound at 500° C. to 1250° C. (hereinafter, sometimes referred to as a demineralization in a gas-phase), and the plant-derived carbonaceous material for a negative electrode can be industrially manufactured in large quantity by using the method of demineralization in a gas-phase.

Further, the inventors examined the performance of non-aqueous electrolyte secondary batteries wherein the carbonaceous material obtained by demineralization in a liquid-phase or demineralization in a gas-phase is used as the negative electrode, and then, found that there was a tendency that a carbonaceous material obtained by the demineralization in a gas-phase has an excellent doping and dedoping performance. Furthermore, the inventors examined the carbonaceous material obtained by demineralization in a liquid-phase or demineralization in a gas-phase, and then, found that iron in the carbonaceous material obtained by demineralization in the gas-phase was remarkably removed more than 10 times than in the carbonaceous material obtained by demineralization in the liquid-phase. If iron is present in carbon as iron oxide, it is considered that a reaction caused by the insertion of lithium into iron oxide occurs, and it has an unsuitable effect on the doping and dedoping performance. Further, there is a possibility that iron oxide is reduced to metallic iron, and then impurities are produced. In addition, when iron is present in carbon as metallic iron or iron is eluted to an electrolytic solution to re-deposit, there is a possibility that the temperature of the battery rises by occurrences of micro short circuits. The carbonaceous material obtained by demineralization in the gas-phase is excellent in the removal of iron. Therefore, it has an excellent doping and dedoping performance compared to the carbonaceous material obtained by demineralization in the liquid-phase, and safety-assured, non-aqueous electrolyte secondary batteries can be manufactured thereby.

However, when the plant-derived char was demineralized in a gas-phase, the minerals were removed therefrom but there was a progression of activation of the plant-derived char. Thus a specific surface area of the plant-derived char was increased. Electrochemical reaction sites are increased by the increase of specific surface area, and thus an amount of the formation of a solid electrolyte layer i.e. SEI (Solid Electrolyte Interface) is increased by an electrolytic reaction of an electrolyte at charge. Therefore, it is known that there is a possibility that an irreversible capacity is increased by consumption of lithium or an amount of self-discharge of battery is increased at the storage in a charge state.

Accordingly, the object of the present invention is to provide a carbonaceous material obtainable from a starting material principally comprising the plant-derived char, wherein the metallic impurities are reduced, and the specific surface area is decreased, and a battery using the same. That is, the object of the present invention is to provide a non-aqueous electrolyte secondary battery using the carbonaceous material, having an excellent dedoping capacity (discharge capacity), non-dedoping capacity (irreversible capacity), and efficiency.

Solution to Problem

The inventors have conducted intensive studies into carbonaceous materials obtainable from the plant-derived char in which the specific surface area is decreased, and as a result, found that a specific surface area of carbonaceous material for non-aqueous electrolyte secondary batteries obtainable by subjecting a plant-derived char demineralized in a gas-phase and an organic compound having a volatile-element of 10 weight % or more in an ignition treatment at 800° C., to heat-treatment under a non-oxidizing gas atmosphere, is drastically reduced.

The inventors found that a specific surface area of carbonaceous material for non-aqueous electrolyte secondary batteries obtainable by subjecting a plant-derived char demineralized in a gas-phase and a carbon precursor (in particular, a non-graphitizable carbon precursor, graphitizable carbon precursor, or a mixture thereof) to heat-treatment under a non-oxidizing gas atmosphere, is drastically reduced.

The inventors found that a specific surface area of carbonaceous material for non-aqueous electrolyte secondary batteries obtainable by subjecting a plant-derived char demineralized in a gas-phase and a volatile organic compound having an actual carbon ratio of less than 5 weight % in an ignition treatment at 800° C. and being solid at ordinary temperature to heat-treatment under a non-oxidizing gas atmosphere, is drastically reduced.

Further, the inventors found that a specific surface area thereof is drastically reduced by subjecting a plant-derived char demineralized in a gas-phase to heat-treatment under a non-oxidizing gas atmosphere containing a vaporized hydrocarbon compound having 1 to 20 carbon atoms. The inventors found that non-aqueous electrolyte secondary batteries using the carbonaceous material obtained by the above procedure exhibits an increase of dedoping capacity, a reduction of non-dedoping capacity, and an increase of efficiency.

The present invention is based on the above findings.

Therefore, the present invention relates to

[1] a carbonaceous material for non-aqueous electrolyte secondary batteries, characterized in that the carbonaceous material is obtained by subjecting a plant-derived char demineralized in a gas-phase and an organic compound having a volatile-element of 10 weight % or more in an ignition treatment at 800° C., to heat-treatment under a non-oxidizing gas atmosphere, and has a specific surface area determined by a BET method of 10 $m^2/g$ or less,

[2] the carbonaceous material for non-aqueous electrolyte secondary batteries of the item [1], wherein the organic compound is a carbon precursor,

[3] the carbonaceous material for non-aqueous electrolyte secondary batteries of the item [1] or [2], wherein the carbon precursor is a non-graphitizable carbon precursor, a graphitizable carbon precursor, or a mixture thereof,

[4] the carbonaceous material for non-aqueous electrolyte secondary batteries of the item [3], wherein the carbon precursor is at least one selected from the group consisting of infusible pitch or tar, thermosetting resins, infusible thermoplastic resins, and plant-derived organic substances,

[5] the carbonaceous material for non-aqueous electrolyte secondary batteries of the item [3], wherein the carbon precursor is at least one selected from the group consisting of pitch and polymer,

[6] The carbonaceous material for non-aqueous electrolyte secondary batteries of the item [1], wherein the organic compound is a volatile organic compound which has an actual carbon ratio of less than 5 weight % in an ignition treatment at 800° C., and is solid at ordinary temperature,

[7] the carbonaceous material for non-aqueous electrolyte secondary batteries of the item [6], wherein the volatile organic compound is thermoplastic resin or a low-molecular organic compound,

[8] the carbonaceous material for non-aqueous electrolyte secondary batteries of the item [6] or [7], wherein the volatile organic compound is at least one selected from the group consisting of polystyrene, polyethylene, polypropylene, poly(meth)acrylic acid, poly(meth)acrylic acid ester, naphthalene, phenanthrene, anthracene, and pyrene,

[9] the carbonaceous material for non-aqueous electrolyte secondary batteries of the item [6] or [7], wherein the heat-treatment is (a) a final heat-treatment at 800 to 1600° C., or (b) pre-heat-treatment at no less than 350° C. to less than 800° C., and final heat-treatment at 800 to 1600° C.,

[10] a carbonaceous material for non-aqueous electrolyte secondary batteries, characterized in that the carbonaceous material is obtained by subjecting a plant-derived char demineralized in a gas-phase to heat-treatment at 600 to 1000° C. in a non-oxidizing gas atmosphere containing a vaporized hydrocarbon compound having 1 to 20 carbon atoms, and subjecting the obtained plant-derived char to heat treatment at 800 to 1600° C. in a non-oxidizing gas atmosphere; and has a specific surface area determined by a BET method of 15 m$^2$/g or less,

[11] the carbonaceous material for non-aqueous electrolyte secondary batteries of the item [10], wherein the hydrocarbon compound is an unsubstituted or substituted hydrocarbon compound having 1 to 20 carbon atoms,

[12] the carbonaceous material for non-aqueous electrolyte secondary batteries of the item [10], wherein the hydrocarbon compound is at least one selected from the group consisting of methane, ethane, ethylene, propylene, benzene, and toluene,

[13] the carbonaceous material for non-aqueous electrolyte secondary batteries of any one of the items [1] to [12], wherein an average (002) interlayer spacing d002 determined by x-ray diffractometry is 0.360 to 0.400 nm, and a true density determined by butanol method $\rho_{Bt}$ is 1.40 to 1.70 g/cm$^3$,

[14] the carbonaceous material for non-aqueous electrolyte secondary batteries of any one of the items [1] to [13], wherein an amount of potassium contained therein is 0.1 weight % or less, and an amount of iron contained therein is 0.02 weight % or less,

[15] the carbonaceous material for non-aqueous electrolyte secondary batteries of any one of the items [1] to [14], wherein the demineralization treatment in a gas-phase is carried out by heating plant-derived char having an average particle diameter of 100 to 10000 μm at 500° C. to 1250° C. under an inert gas atmosphere containing a halogen compound,

[16] a method for manufacturing a carbonaceous material for a negative electrode of non-aqueous electrolyte secondary batteries comprising the following steps:
(1) mixing 35 weight % or more of a plant-derived char demineralized in a gas-phase, and an organic compound having a volatile-element of 10 weight % or more in an ignition treatment at 800° C., to obtain a mixture comprising them, and
(2) subjecting the mixture to heat-treatment,

[17] the method for manufacturing a carbonaceous material for a negative electrode of non-aqueous electrolyte secondary batteries of the item [16], wherein the organic compound is a carbon precursor, and the mixture comprising the plant-derived char demineralized in a gas-phase and a carbon precursor of 95:5 to 45:55 in a ratio by weight is obtained in the mixing step (1),

[18] the method for manufacturing a carbonaceous material for a negative electrode of non-aqueous electrolyte secondary batteries of the item [17], wherein the carbon precursor is a non-graphitizable carbon precursor, graphitizable carbon precursor, or mixture thereof,

[19] the method for manufacturing a carbonaceous material for a negative electrode of non-aqueous electrolyte secondary batteries of the item [18], wherein the non-graphitizable carbon precursor is at least one selected from the group consisting of infusible pitch or tar, thermosetting resins, infusible thermoplastic resins, or plant-derived organic substances,

[20] the method for manufacturing a carbonaceous material for a negative electrode of non-aqueous electrolyte secondary batteries of the item [16], wherein the carbon precursor is a graphitizable carbon precursor or a mixture of non-graphitizable carbon precursor and graphitizable carbon precursor, and the mixture comprising the plant-derived char demineralized in a gas-phase and a carbon precursor (the graphitizable carbon precursor or the mixture of non-graphitizable carbon precursor and graphitizable carbon precursor) of 95:5 to 42.5:57.5 in a ratio by weight is obtained in the mixing step (1),

[21] the method for manufacturing a carbonaceous material for a negative electrode of non-aqueous electrolyte secondary batteries of the item [16], wherein the organic compound is a graphitizable carbon precursor, and the mixture comprising the plant-derived char demineralized in a gas-phase and the graphitizable carbon precursor of 96.5:3.5 to 40:60 in a ratio by weight is obtained in the mixing step (1),

[22] the method for manufacturing a carbonaceous material for a negative electrode of non-aqueous electrolyte secondary batteries of any one of the items [18], [20], and [21], wherein the graphitizable carbon precursor is at least one selected from the group consisting of pitch and a polymer,

[23] the method for manufacturing a carbonaceous material for a negative electrode of non-aqueous electrolyte secondary batteries of the item 16, wherein the organic compound is a volatile organic compound which has an actual carbon ratio of less than 5 weight % in an ignition treatment at 800° C., and is solid at ordinary temperature; and the mixture comprising the plant-derived char demineralized in a gas-phase and the volatile organic compound (which has an actual carbon ratio of less than 5 weight % in an ignition treatment at 800° C., and is solid at ordinary temperature) of 97:3~40:60 in a ratio by weight is obtained in the mixing step (1),

[24] the method for manufacturing a carbonaceous material for a negative electrode of non-aqueous electrolyte secondary batteries of the item [23], wherein the volatile organic compound is thermoplastic resin or a low-molecular organic compound,

[25] the method for manufacturing a carbonaceous material for a negative electrode of non-aqueous electrolyte secondary batteries of the item [23] or [24], wherein the volatile organic compound is at least one selected from the group consisting of polystyrene, polyethylene, polypropylene, poly(meth)acrylic acid, poly(meth)acrylic acid ester, naphthalene, phenanthrene, anthracene, and pyrene,

[26] the method for manufacturing a carbonaceous material for a negative electrode of non-aqueous electrolyte secondary batteries of any one of the items [16] to [25], wherein the heat-treatment is (a) final heat treatment at 800 to 1600° C., or (b) pre-heat-treatment at no less than 350° C. to less than 800° C., and final heat-treatment at 800 to 1600° C.,

[27] a method for manufacturing a carbonaceous material for a negative electrode of non-aqueous electrolyte secondary batteries comprising the following steps:
(1) subjecting a plant-derived char demineralized in a gas-phase to heat treatment at 600 to 1000° C. in a non-oxidizing gas atmosphere containing a vaporized hydrocarbon compound having 1 to 20 carbon atoms, and
(2) subjecting the obtained plant-derived char to heat-treatment at 800 to 1600° C. in a non-oxidizing gas atmosphere,

[28] the method for manufacturing a carbonaceous material for a negative electrode of non-aqueous electrolyte secondary batteries of the item [27], wherein the hydrocarbon compound is an unsubstituted or substituted hydrocarbon compound having 1 to 20 carbon atoms,

[29] the method for manufacturing a carbonaceous material for a negative electrode of non-aqueous electrolyte secondary batteries of the item [27], wherein the hydrocarbon compound is at least one selected from the group consisting of methane, ethane, ethylene, propylene, benzene, and toluene,

[30] the method for manufacturing a carbonaceous material for a negative electrode of non-aqueous electrolyte secondary batteries of any one of the items [16] to [29], wherein the demineralization treatment in a gas-phase is carried out by heating plant-derived char having an average particle diameter of 100 to 10000 μm at 500° C. to 1250° C. under an inert gas atmosphere containing a halogen compound,

[31] a negative electrode for non-aqueous electrolyte secondary batteries comprising the carbonaceous material of any one of the items [1] to [15],

[32] a non-aqueous electrolyte secondary battery comprising the negative electrode of the item [31],

[33] a vehicle comprising the non-aqueous electrolyte secondary battery of the item 32.

Advantageous Effects of Invention

According to the carbonaceous material for non-aqueous electrolyte secondary batteries of the present invention, the non-aqueous electrolyte secondary battery such as a lithium-ion secondary battery having a high dedoping capacity (discharge capacity) and low non-dedoping capacity (irreversible capacity) can be manufactured by using the carbonaceous material as a negative electrode of the non-aqueous electrolyte secondary battery. That is to say, the non-aqueous electrolyte secondary battery having an excellent efficiency can be manufactured. Further, according to the method for manufacturing a carbonaceous material for non-aqueous electrolyte secondary batteries of the present invention, a carbonaceous material for a negative electrode for non-aqueous electrolyte secondary batteries having an excellent efficiency can be easily manufactured. The non-aqueous electrolyte secondary battery using the carbonaceous material for a negative electrode of the present invention exhibits an excellent efficiency, and thus is useful for a vehicle such as hybrid electric vehicles (HEV) and electrical vehicles (EV) in which long service life and high input/output performances are required.

The carbonaceous material for non-aqueous electrolyte secondary batteries of the present invention can be obtained by mixing a plant-derived char demineralized in a gas-phase and an organic compound which may generate volatile-elements (volatile organic compound), and subjecting the whole to heat-treatment, as a carbonaceous material having low specific surface area. Further, an irreversible capacity of a battery using the resulting carbonaceous material for non-aqueous electrolyte secondary batteries becomes lower. In particular, a charge-discharge capacity is increased and a first efficiency is increased by mixing the plant-derived char and the organic compound at a heat-treatment and coating the volatile organic compound to the plant-derived char at the same time as the heat treatment, compared to the case where they are mixed after heat-treatment. The above effects are remarkable in the case where the plant-derived char demineralized in a gas-phase is used. For example, when the palm shell char demineralized in a gas-phase and polystyrene were mixed at the ratio of 80 to 20 and were heat-treated at 1200° C., a discharge capacity/irreversible capacity became 402/58 (mAh/g). On the other hand, when the palm shell char demineralized in a gas-phase was heat-treated at 1200° C., and then the heat-treated palm shell char and polystyrene were mixed at the ratio of 80 to 20 and were heat-treated at 1200° C., a discharge capacity/irreversible capacity was 360/58 (mAh/g). From the above results, it is known that the discharge capacity can be increased by subjecting the low-carbonized material to coating treatment at the same time as the heat treatment.

Furthermore, the carbonaceous material for a non-aqueous electrolyte secondary battery of the present invention can be obtained by subjecting a plant-derived char demineralized in a gas-phase to heat treatment in a non-oxidizing gas atmosphere containing a vaporized hydrocarbon compound having 1 to 20 carbon atoms, as a carbonaceous material having low specific surface area. Further, an irreversible capacity of a battery using the resulting carbonaceous material for non-aqueous electrolyte secondary batteries becomes lower. In particular, a charge-discharge capacity is increased and a first efficiency is increased by flowing the above non-oxidizing gas at heat-treatment and coating the vaporized hydrocarbon compound to the plant-derived char at the same time as the final heat-treatment, compared to the case where they are treated by the non-oxidizing gas after final heat-treatment. The above effects are remarkable in the case where the plant-derived char demineralized in a gas-phase is used.

DESCRIPTION OF EMBODIMENTS

Figure 1:
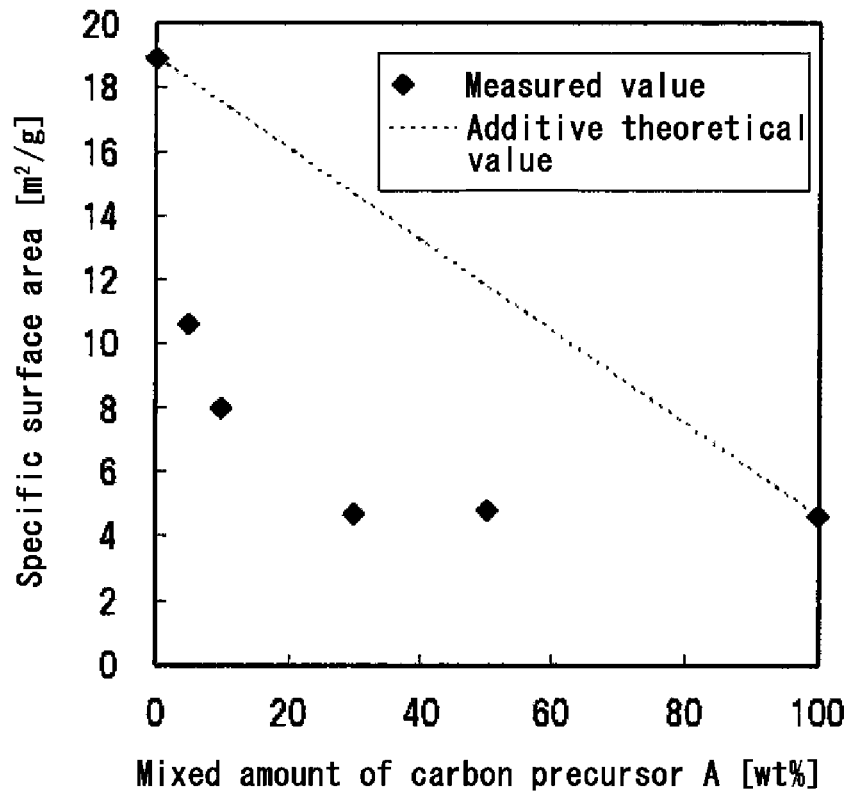
FIG. 1 is a graph showing the changes of specific surface area of the carbonaceous materials (Examples 1 to 3, Comparative Examples 1 and 3, and Referential Example 3) according to mixed amounts of carbon precursor A (non-graphitizable carbon precursor).

[1] Carbonaceous Material for Non-aqueous Electrolyte Secondary Batteries

The carbonaceous material for non-aqueous electrolyte secondary batteries of the present invention, characterized in that the carbonaceous material is obtained by subjecting a plant-derived char demineralized in a gas-phase and an organic compound having a volatile-element of 10 weight % or more in an ignition treatment at 800° C., to heat-treatment under a non-oxidizing gas atmosphere, and has a specific surface area determined by a BET method of 10 m²/g or less.

One embodiment of the carbonaceous material for non-aqueous electrolyte secondary batteries of the present invention, characterized in that the carbonaceous material is obtained by subjecting a plant-derived char demineralized in a gas-phase and a carbon precursor (in particular, a non-graphitizable carbon precursor, a graphitizable carbon precursor, or a mixture thereof), to heat treatment under a non-oxidizing gas atmosphere, and has a specific surface area determined by a BET method of 10 m$^2$/g or less.

One embodiment of the carbonaceous material for non-aqueous electrolyte secondary batteries of the present invention, characterized in that the carbonaceous material is obtained by subjecting a plant-derived char demineralized in a gas-phase and a graphitizable carbon precursor, to heat-treatment under a non-oxidizing gas atmosphere, and has a specific surface area determined by a BET method of 10 m$^2$/g or less.

One embodiment of the carbonaceous material for non-aqueous electrolyte secondary batteries of the present invention, characterized in that the carbonaceous material is obtained by subjecting a plant-derived char demineralized in a gas-phase and a volatile organic compound which has an actual carbon ratio of less than 5 weight % in an ignition treatment at 800° C. and is solid at ordinary temperature, to heat-treatment under a non-oxidizing gas atmosphere, and has a specific surface area determined by a BET method of 10 m$^2$/g or less.

One embodiment of the carbonaceous material for non-aqueous electrolyte secondary batteries of the present invention, characterized in that the carbonaceous material is obtained by subjecting a plant-derived char demineralized in a gas-phase to heat treatment at 600 to 1000° C. in a non-oxidizing gas atmosphere containing a vaporized hydrocarbon compound having 1 to 20 carbon atoms, and subjecting the obtained plant-derived char to heat-treatment at 800 to 1600° C. in a non-oxidizing gas atmosphere; and has a specific surface area determined by a BET method of 15 m$^2$/g or less.

(Plant-derived Char)

A raw plant of the plant-derived char which may be used in the present invention, is not particularly limited, for example, there may be mentioned palm shell, coffee bean, tea leaf, sugar cane, fruit (mandarin orange, or banana), straw, broad-leaf tree, and chaff. The above raw plants can be used alone or in combination of two or more. However, palm shell is preferable because palm shells can be available in large amounts. A palm which is a raw form of the palm shell is not particularly limited, but includes oil palm (palm tree), coconut, salak, or double coconut. Palm shells obtained from these palms can be used alone or in combination of two or more, but palm shell derived from coconut or oil palm is most preferable. This is because coconut or oil palm is used as a raw form of foods, detergents, or biodiesel fuels, and as a result, the palm shell thereof is generated as a biomass waste in large amounts. In the method for manufacturing of the present invention, a form of char (such as palm shell char) which is obtained by preliminarily heat treating the above plants is available, and thus the char is preferably used as a source thereof. Generally, the char means a carbon-rich, powdery solid substance which is generated by heating coal without melting and softening. However, in the present specification, the char also means a carbon-rich, powdery solid substance which is generated by heating an organic substance without melting and softening.

A method for preparing chars from plants is not particularly limited. However, for example, the char may be prepared by heating a plant material under an inert gas atmosphere at 300° C. or more.

The carbonaceous materials for a negative electrode prepared from these plant-derived chars can be doped with a large amount of active material, and thus it is useful as the negative electrode material for non-aqueous electrolyte secondary batteries. However, the plant-derived char contains a wide variety of metallic elements. In particular, it contains a large amount of potassium. (For example, the palm shell char contains about 0.3% of potassium.) Further, if the carbonaceous material prepared from a plant-derived char containing a large amount of a metallic element such as iron (For example, palm shell char contains 0.1% of iron.) is used as the negative electrode, it will have an unsuitable effect on electrochemical performance and safety. Therefore, it is preferable that the amounts of potassium, iron and the like contained in the carbonaceous material for a negative electrode are reduced as much as possible.

Further, the plant-derived char contains alkali metal such as sodium, alkali earth metal such as magnesium or calcium, transition metal such as iron or copper, and other elements in addition to potassium, and thus it is preferable that the amounts of these elements contained therein are also reduced. If these metals are contained therein, there is a high possibility that impurities are eluted to the electrolytic solution in dedoping from the negative electrode, and it has adverse effects on battery performance and safety.

As mentioned above, the plant-derived char contains a lot of minerals, and thus it is required to carry out the demineralizing treatment. The plant-derived char used in the present invention is a plant-derived char demineralized in a gas-phase (hereinafter referred to as a plant-derived char carbon precursor).

The demineralization in a gas-phase can be performed by the heat-treatment in a mixture gas of a halogen compound and an inert gas, as after-described in item "Method for manufacturing carbonaceous material for non-aqueous electrolyte secondary batteries". The amount of potassium of the plant-derived char carbon precursor is preferably 0.1 weight % or less, more preferably 0.05 weight % or less, further preferably 0.03 weight % or less. Further, the amounts of iron of the plant-derived char carbon precursor is preferably 0.020 weight % or less, more preferably 0.015 weight % or less, more preferably 0.010 weight % or less, further preferably 0.005 weight % or less. If the amount of potassium is higher than 0.1 weight % and the amount of iron is higher than 0.02 weight %, dedoping capacity becomes lower and non-dedoping capacity becomes higher in the non-aqueous electrolyte secondary battery using the obtained carbonaceous material for a negative electrode. In addition to that, when metal elements are eluted to an electrolytic solution and re-deposit, a short circuit occurs and thus it sometimes becomes a serious safety problem.

Preferably, the plant-derived char can become a non-graphitizable carbonaceous material having 1.40 to 1.70 g/cm$^3$ of true density $\rho_{Bt}$ determined by the butanol method and 0.380 to 0.400 nm of average (002) interlayer spacing d002 determined by X-ray diffractometry by a heat-treatment. The true density of the carbonaceous material obtained from the plant-derived char is more preferably 1.42 to 1.65 g/cm$^3$, further preferably 1.44 to 1.60 g/cm$^3$. In addition, true density $\rho_{Bt}$ may be 1.40 to 1.51 g/cm$^3$, 1.42 to 1.50 g/cm$^3$, or 1.44 to 1.49 g/cm$^3$. The heat-treatment temperature to obtain the non-graphitizable carbonaceous material having the above physical properties is not particularly limited so long as it is in a range of 800 to 1600° C. For example, the "plant-derived char wherein a true density $\rho_{Bt}$ is 1.40 to 1.60 g/cm³ (or may be 1.40 to 1.51 g/cm³) and average (002) interlayer spacing d002 determined by X-ray diffractometry is 0.380 to 0.400 nm when the plant-derived char is heat-treated at 1200° C." can be used in the present invention. The average (002) interlayer spacing d002 and true density $\rho_{Bt}$ may be measured by the after-mentioned measuring methods.

A most preferable plant-derived char carbon precursor includes a palm shell char carbon precursor. When the palm shell char is carbonized at 1000 to 1600° C., a true density $\rho_{Bt}$ of the palm shell char is preferably 1.40 to 1.70 g/cm³(or may be 1.40 to 1.51 g/cm³), and an average (002) interlayer spacing d002 determined by X-ray diffractometry is preferably 0.380 to 0.400 nm or more, and a true density $\rho_{Bt}$ is further preferably 1.42 to 1.60 g/cm³(or may be 1.42 to 1.50 g/cm³), and an average (002) interlayer spacing d002 is further preferably 0.380 to 0.390 nm.

<<Organic Compound>>

In the carbonaceous material for non-aqueous electrolyte secondary batteries of the present invention, the organic compound to be mixed with plant-derived char demineralized in a gas-phase generates a volatile-element (volatile organic compound) of 10 weight % or more when it is ignited at 800° C. The organic compound is not limited, but includes a carbon precursor such as a non-graphitizable carbon precursor, graphitizable carbon precursor, or mixture thereof. Further, the organic compound includes a volatile organic compound which has an actual carbon ratio of less than 5 weight % in an ignition treatment at 800° C., and is solid at ordinary temperature. An upper limit of the volatile-element of organic compound used in the present invention is not limited. That is, an organic compound having a volatile-element of 100 weight % can be used.

The expression "volatile-element of 10 weight % or more" used herein substantially means "actual carbon ratio of less than 90 weight %". Therefore, the above "volatile organic compound which has an actual carbon ratio of less than 5 weight % in an ignition treatment at 800° C., and is solid at ordinary temperature" means "volatile organic compound which has a volatile-element of 95 weight % or more in an ignition treatment at 800° C., and is solid at ordinary temperature".

The actual carbon ratio in the case of the ignition treatment at 800° C. is not limited as long as the effect of the present invention can be achieved. However, when the carbon precursor is used as the organic compound, the actual carbon ratio is preferably no less than 5 weight % to less than 90 weight %. In particular, when the non-graphitizable carbon precursor is used, the actual carbon ratio is preferably no less than 20 weight % to less than 90 weight %. When the graphitizable carbon precursor is used, the actual carbon ratio is preferably no less than 5 weight % to less than 50 weight %. That is to say, the carbon precursor is used as the organic compound, the volatile organic compound (volatile-element) contained therein is no less than 10 weight % to less than 95 weight %. In particular, when the non-graphitizable carbon precursor is used, the volatile-element is preferably no less than 10 weight % to less than 80 weight %. When the graphitizable carbon precursor is used, the volatile-element is preferably no less than 50 weight % to less than 95 weight %.

The state of the organic compound is not limited, but the organic compound is preferably solid or liquid at ordinary temperature. When the organic compound is solid, it is easy to homogeneously mix the organic compound with the plant-derived char carbon precursor at heat-treatment. On the other hand, when the organic compound is liquid, the plant-derived char precursor preliminarily mixed therewith can be heat-treated. In addition, the organic compound can be supplied by placing it upstream of gas flow and vaporizing at the heat-treatment.

<<Carbon Precursor>>

The carbon precursor used herein can be non-graphitized or graphitized by the heat-treatment. In particular, the carbon precursor means one which obtains a true density $\rho_{Bt}$ of 1.4 to 2.0 g/cm³ by the heat-treatment. That is, the carbon precursor includes a graphitizable carbon precursor, a non-graphitizable carbon precursor, or a mixture thereof. In particular, the carbon precursor A described in the Examples is a non-graphitizable carbon precursor, the pitch based carbon precursor B is a graphitizable carbon precursor, and the carbon precursor C is a mixture thereof When the non-graphitizable carbon precursor and the graphitizable carbon precursor are mixed and used, the mixture ratio is not particularly limited.

The carbon precursor which can be used in the present invention is not particularly limited as long as it can generate volatile-component (such as hydrocarbon gas, or tar) capable of reducing the specific surface area of carbonaceous material prepared from the plant-derived char at the carbonization (heat-treatment). In particular, there may be mentioned petroleum pitch, coal pitch, thermoplastic resin (such as polyvinyl alcohol, polyethylene terephthalate, polyacetal, polyacrylonitrile, styrene/divinylbenzenecopolymer, polyimide, polycarbonate, modified polyphenylene ether, polybutylene terephthalate, polyarylate, polysulfone, Polyphenylenesulfide, polyether ether ketone, polyimide resin, fluorine resin, polyamide-imide, or polyether ether ketone), thermosetting resins (such as phenol resin, furan resin, amino resin, unsaturated polyester resin, diallyl phthalate resin, alkyd resin, epoxy resin, urethane resin, or silicon resin), or plant-derived organic substances. When the plant-derived, organic substance is used as the carbon precursor, a plant-derived, organic substance demineralized in a gas phase does not contain volatile-elements and thus a plant-derived, organic substance which is not demineralized in a gas phase is used. In particular, a plant-derived organic substance wherein minerals are removed by the demineralization in a liquid-phase is preferable. The term "plant-derived, organic substance" used herein includes plant-derived polymers.

Among the above carbon precursors, the most preferable carbon precursor is petroleum pitch, or coal pitch. This is because they can efficiently generate the volatile-elements (such as hydrocarbon gas or high condensed aromatic tar elements) at the carbonization (heat-treatment). An amount of the volatile-elements (such as hydrocarbon gas or tar component) contained in the carbon precursor is not particularly limited, but a lower limit is 10 weight % or more. Further, an upper limit of an amount of the volatile-elements is not particularly limited, but is preferably 95 weight % or less, more preferably 80 weight % or less, further preferably 50 weight % or less.

Specifically, the carbon precursor is preferably converted into carbonaceous material having a true density $\rho_{Bt}$ of 1.4 to 2.0 g/cm³, an average (002) interlayer spacing d002 determined by x-ray diffractometry of 0.340 to 0.400 nm, and, an atom ratio (H/C) of hydrogen atoms to carbon atoms determined by elemental analysis of less than 0.1, by the heat-treatment. The heat-treatment temperature to obtain the non-graphitizable carbonaceous material having the above physical properties is not particularly limited so long as it is in a range of 800 to 1600° C. For example, the "carbon precursor wherein a $\rho_{Bt}$ is 1.4 to 2.0 g/cm³ and average (002) interlayer spacing d002 determined by X-ray diffractometry is 0.340 to 0.400 nm when the plant-derived char is heat-treated at 1200° C." can also be used in the present invention. The atom ratio (H/C), average (002) interlayer spacing d002 and true density may be measured by the after-mentioned measuring methods.

(Non-graphitizable Carbon Precursor)

The non-graphitizable carbon precursor used herein can be non-graphitized by the heat-treatment. In particular, the non-graphitizable carbon precursor means a carbon precursor which obtains a true density $\rho_{Bt}$ of 1.40 to 1.60 g/cm³ by the heat-treatment. The heat-treatment temperature to obtain the non-graphitizable carbonaceous material is not particularly limited so long as it is in a range of 800 to 1600° C. The average (002) interlayer spacing d002 determined by X-ray diffractometry of non-graphitized carbonaceous material is not limited, but is preferably 0.370 to 0.400 nm. As for the specific examples of non-graphitizable carbon precursor, there may be mentioned infusibilized pitch or tar, thermosetting resin, infusibilized thermoplastic resin, and plant-derived organic substances (such as palm shells, coffee beans, tea leaves, sugar cane, fruits (tangerines, or bananas), straw, rice hulls, broad-leaved trees, coniferous trees, and bamboo).

(Graphitizable Carbon Precursor)

The graphitizable carbon precursor used herein can be graphitized by the heat-treatment. In particular, the graphitizable carbon precursor means a carbon precursor which obtains a true density $\rho_{Bt}$ of 1.6 to 2.0 g/cm³ by the heat-treatment. The heat-treatment temperature to obtain the graphitizable carbonaceous material is not particularly limited so long as it is in a range of 800 to 1600° C. The average (002) interlayer spacing d002 determined by X-ray diffractometry of graphitizable carbonaceous material is not limited, but is preferably 0.340 to 0.375 nm.

The graphitizable carbon precursor is converted into the graphitizable carbonaceous material by the heat-treatment. The actual carbon ratio thereof is not limited as long as it is 5 weight % or more. The actual carbon ratio can be measured by the after-mentioned measuring methods.

Further, the graphitizable carbon precursor which may be used in the present invention is not particularly limited, so long as it can generate volatile-component (such as tar, and hydrocarbon gas) capable of reducing a specific surface area of carbonaceous material prepared from plant-derived char at the carbonization (heat-treatment), but includes pitch or a polymer. Specifically, the pitch includes petroleum pitch and coal pitch which are not infusibilized. The polymer includes thermoplastic resin which is not infusibilized (such as polyvinyl alcohol, polyethylene terephthalate, polyacetal, polyacrylonitrile, styrene/divinylbenzenecopolymer, polyimide, polycarbonate, modified polyphenylene ether, polybutylene terephthalate, polyarylate, polysulfone, Polyphenylenesulfide, polyimide resin, fluorine resin, polyamide-imide, or polyether ether ketone). However, the petroleum pitch and coal pitch which are not infusibilized is preferable. This is because they can effectively generate hydrocarbon gas or an aromatic tar element with high condensation at the carbonization (heat-treatment).

The carbon precursor (non-graphitizable carbon precursor, or graphitizable carbon precursor) is converted into carbonaceous material by the heat-treatment. The actual carbon ratio thereof is not limited as long as it is 5 weight % or more. The actual carbon ratio can be measured by the following method.

The actual carbon ratio is measured by igniting a sample in an inert gas and then quantitating a carbon amount of residue on ignition. About 1 g of volatile organic compound (accurate weight of the volatile organic compound is defined as "$W_1$ (g)") is charged into a crucible, and the crucible is heated to 800° C. at a rate of 10° C./h in an electric furnace while flowing nitrogen gas at a rate of 20 liters/min. Subsequently, it is ignited at 800° C. for 1 hour. A weight of the remaining matter is defined as the residue on ignition ($W_2$(g)).

Next, elements of the above residue on ignition is analyzed in accordance with the method defined in HS M8819, and a weight ratio of carbon ($P_1$(%)) is determined. The actual carbon ratio ($P_2$(%)) is calculated by the following equation.

$$P_2 = P_1 \times \frac{W_2}{W_1} \quad \text{[Math. 1]}$$

A density of the carbonaceous material obtained by heat-treating a graphitizable carbon precursor is 1.6 to 2.0 g/cm³, and a density of the carbonaceous material obtained by heat-treating a non-graphitizable, carbon precursor is 1.4 to 1.6 g/cm³. That is, the density of the obtained carbonaceous material varies according to the types of carbon precursors. Therefore, the carbonaceous material derived from the graphitizable carbon precursor and the non-graphitizable, carbonaceous material derived from plant-derived char contained in the carbonaceous material for non-aqueous electrolyte secondary batteries of the present invention can be separated by density. Further, the non-graphitizable, carbonaceous material has the density range of 1.4 to 1.6 g/cm, but a density of plant-derived, non-graphitizable, carbonaceous material may differ from a density of non-graphitizable, carbonaceous material which is not derived from a plant. Therefore, it is possible to separate the non-graphitizable carbonaceous material derived from the plant-derived char contained in the carbonaceous material of the present invention from another non-graphitizable, carbonaceous material by density. For example, as a separation method by density, there may be mentioned a density-gradient tube method. Specifically, the carbonaceous materials can be separated respectively, for example, by the following method.

An immersion fluid is charged into a density-gradient tube according to the "JIS K 7112 Plastics-Method of determining density and relative density of non-cellular plastics". The carbonaceous material is moisturized by a low density liquid among two types of liquids used in the density-gradient tube method, and gently charged into the tube. The tube and carbonaceous material are allowed to stand until they come to equilibrium. Then, the carbonaceous material prepared from the plant-derived char can be separated from the carbonaceous material prepared from a graphitizable carbon precursor by density difference.

$$P_2 = P_1 \times \frac{W_2}{W_1} \quad \text{[Math. 1]}$$

$$P = \frac{W_0 - W}{W_0} \quad \text{[Math. 2]}$$

An amount of the volatile-elements (such as hydrocarbon gas or tar component) contained in the carbon precursor is not particularly limited, but the lower limit thereof is preferably 10 weight %. In addition, an upper limit of the amount of the volatile-elements is not particularly limited, but is preferably 95 weight % or less, more preferably 80 weight % or less, further preferably 50 weight % or less. An amount of the volatile-elements is calculated from a residue on ignition after the ignition of a sample in an inert gas and an applied amount of the sample. About 1 g of volatile organic compound (accurate weight of the volatile organic compound is defined as "$W_0$ (g)") is charged into a crucible, and the crucible is heated to 800° C. at a rate of 10° C./h in an electric furnace while flowing nitrogen gas at a rate of 20 liters/min. Subsequently, it is ignited at 800° C. for 1 hour. A weight of the remaining matter is defined as the residue on ignition (W (g)). An amount of the volatile-elements (P (%)) is calculated by the following equation.

$$P = \frac{W_0 - W}{W_0} \qquad \text{[Math. 2]}$$

In the graphitizable carbon precursor described in the present specification, the term "petroleum pitch or coal pitch which is not infusibilized", "thermoplastic resin which is not infusibilized" or the like means a graphitizable carbon precursor which is converted into graphitizable carbonaceous material by the final heat-treatment. That is, they include a carbon precursor which is treated to impart mild infusibility by oxidization.

<<Volatile Organic Compound>>

The volatile organic compound that can be used in the present invention is not particularly limited, as long as it has an actual carbon ratio of less than 5 weight % in an ignition treatment at 800° C., and is solid at ordinary temperature (hereinafter sometimes referred to as the volatile organic compound). However, the volatile organic compound preferably generates volatile-component (volatile organic compound; such as hydrocarbon gas or tar component) capable of reducing the specific surface area of carbonaceous material prepared from the plant-derived char. In the volatile organic compound used in the present invention, an amount of the volatile-component (such as hydrocarbon gas or a tar component) is not particularly limited, but a lower limit is preferably 95 weight % or more, and an upper limit is not particularly limited. The term "ordinary temperature" used herein means 25° C.

As for the volatile organic compound, there may be mentioned thermoplastic resin or a low-molecular organic compound. Specifically, the thermoplastic resins include polystyrene, polyethylene, polypropylene, poly(meth) acrylic acid, poly(meth)acrylic acid ester, or the like, and as for low-molecular organic compound, includes naphthalene, phenanthrene, anthracene, pyrene or the like. In the present specification, poly(meth)acrylic acid means polyacrylic acid, polymethacrylic acid, or a mixture thereof. Further, in the present specification, poly(meth)acrylic acid ester means polyacrylic acid ester, polymethacrylic acid ester, or a mixture thereof <<Mixture>>

The mixture heat-treated in the present invention is not particularly limited, but preferably the mixture contains the plant-derived char demineralized in a gas-phase and an organic compound having a volatile-element of 10 weight % or more in an ignition treatment at 800° C. of 97:3 to 40:60 in a ratio by weight.

One embodiment of the mixture heat-treated in the present invention is not particularly limited, but the mixture contains the plant-derived char carbon precursor demineralized in a gas-phase and a carbon precursor (non-graphitizable carbon precursor, graphitizable carbon precursor, or a mixture thereof) having an actual carbon ratio of 5 weight % or more in an ignition treatment at 800° C. of preferably 95:5 to 45:55 in a ratio by weight, or more preferably 93:7 to 45:55 in a ratio by weight. The ratio by weight of a plant-derived char carbon precursor and carbon precursor is more preferably 90:10 to 50:50, further preferably 85:15 to 65:35. In addition, one embodiment of the mixture contains the plant-derived char demineralized in a gas-phase and a graphitizable carbon precursor of preferably 96.5:3.5 to 40:60 in a ratio by weight. The ratio by weight of plant-derived char and a graphitizable carbon precursor is more preferably 96:4 to 45:55, further preferably 95:5 to 50:50.

Mixing may be performed in a step before or after a step of pulverization of the plant-derived char. In the case where the mixing is performed before the step of pulverization of the plant-derived char, the pulverization and mixing can be simultaneously performed by simultaneously supplying the plant-derived char and the organic compound having a volatile-element of 10 weight % or more in an ignition treatment at 800° C. to a pulverizing equipment while weighing them on a scale.

Further, mixing of the plant-derived char carbon precursor and the carbon precursor may be performed before or after the pulverization of both. Further, mixing methods are not limited so long as both can be homogeneously mixed.

Furthermore, one embodiment of the mixture heat-treated in the present invention contains (a) the plant-derived char carbon precursor demineralized in gas-phase and (b) the graphitizable carbon precursor having an actual carbon ratio of 5 weight % or more in an ignition treatment at 800° C., or a mixture of graphitizable carbon precursor and non-graphitizable carbon precursor, of 95:5 to 42.5:57.5 in a ratio by weight. The ratio by weight of a plant-derived char carbon precursor and a carbon precursor is more preferably 90:10 to 50:50, further preferably 85:15 to 65:35.

One embodiment of the mixture heat-treated in the present invention contains the plant-derived char demineralized in a gas-phase and volatile organic compound of 97:3 to 40:60 in a ratio by weight. The ratio by weight of plant-derived char and the volatile organic compound is more preferably 95:5 to 60:40, further preferably 93:7 to 80:20. For example, when the volatile organic compound is 3 parts by weight or more, the specific surface area can be sufficiently reduced. On the other hand, if the volatile organic compound exceeds 60 parts by weight, the reductive effects of specific surface area are saturated, and thus the volatile organic compound is wasted.

Mixing may be performed in a step before or after a step of pulverization of the plant-derived char. In the case that the mixing is performed before the step of pulverization of the plant-derived char, the pulverization and mixing can be simultaneously performed by simultaneously supplying the plant-derived char and the volatile organic compound to pulverizing equipment while weighing them on a scale.

Further, the mixing preferably is carried out after the pulverization of plant-derived char. In this case, mixing methods are not limited so long as both can be homogeneously mixed. The volatile organic compound is preferably mixed in a particle form, but particle shape and particle diameter are not particularly limited. From the point of view that the volatile organic compound is evenly dispersed in the pulverized plant-derived char, an average particle diameter is preferably 0.1 to 2000 µm, more preferably 1 to 1000 µm, further preferably 2 to 600 µm.

The mixture may comprise other components other than plant-derived char, a carbon precursor, and a volatile organic compound so long as the effects in the carbonaceous material for non-aqueous electrolyte secondary batteries of the present invention are obtained, i.e. the specific surface area of the carbonaceous material is reduced. For example, the mixture can comprise natural graphites, synthetic graphites, metallic materials, alloy materials, or oxide materials. An amount of the other components is not particularly limited, but is preferably 50 parts by weight or less, more preferably 30 parts by weight, further preferably 20 parts by weight, most preferably 10 parts by weight, with respect to 100 parts by weight of the mixture of the plant-derived char carbon precursor and carbon precursor.

<<Hydrocarbon Compound having 1 to 20 Carbon Atoms>>

The hydrocarbon compound used in the present invention can be evaporated and added as a gas at heat treatment, and it is prepared from the plant-derived char. The hydrocarbon compound is not limited so long as it can reduce the specific surface area of carbonaceous material.

The number of carbon atoms of the hydrocarbon compound is not particularly limited, so long as the number is 1 to 20, but is preferably 1 to 18, more preferably 1 to 15, further preferably 1 to 10. The state of the hydrocarbon compound is not limited, but the hydrocarbon compound is preferably solid or liquid. When the carbon atoms exceed 20, the hydrocarbon compounds which are solid at ordinary temperature are increased, and thus a procedure to evaporate at the heat treatment is complicated. In connection to this, 1 to 20 carbon atoms of the hydrocarbon compound includes the number of carbon atoms of the substituent group mentioned below.

(Hydrocarbon Compound)

The hydrocarbon compound may be a saturated hydrocarbon compound or unsaturated hydrocarbon compound. Further, it may be a linear hydrocarbon compound or cyclic hydrocarbon compound. When it is the unsaturated hydrocarbon compound, the unsaturated bond may be a double bond or triple bond, and the number of unsaturated bonds contained in one molecule is not particularly limited.

For example, the linear hydrocarbon compound is an aliphatic hydrocarbon compound, there may be mentioned linear or branched alkane, alkene, or alkyne. As the cyclic hydrocarbon compounds there may be mentioned alicyclic hydrocarbon compound (such as cycloalkane, cycloalkane, cycloalkyne) or aromatic hydrocarbon compound.

Specifically, as the aliphatic hydrocarbon compounds, there may be mentioned methane, ethane, propane, butane, pentane, hexane, octane, nonane, decane, ethylene, propyrene, butene, pentene, hexane or acethylene, but ethylene is preferable. Further, as the alicyclic hydrocarbon compound, there may be mentioned cyclopentane, cyclohexane, cycloheptane, cyclooctane, cyclononane, cyclopropene, cyclopentene, cyclohexene, cycloheptene, cyclooctene, decalin, norbornene, methylcyclohexane, or norbornadiene, but cyclohexene is preferable. Furthermore, as the aromatic hydrocarbon compound there may be mentioned benzene, toluene, xylene, mesitylene, cumene, butylbenzene or styrene, but toluene or styrene is preferable.

The hydrocarbon compound may be a substituted hydrocarbon compound. The substitution means that hydrogen atoms of the hydrocarbon compound are substituted. The substituent group is not particularly limited, for example, there may be mentioned an alkyl group having 1 to 4 carbon atoms (preferably an alkenyl group having 1 to 2 carbon atoms), an alkenyl group having 1 to 4 carbon atoms (preferably an alkenyl group having 1 to 2 carbon atoms), a cycloalkyl group having 3 to 8 carbon atoms (preferably, a cycloalkyl group having 3 to 6 carbon atoms), hydroxyl group (—OH), aldehyde group (—CHO), a carboxyl group (—COOH), an amino group (—NH$_2$), cyano group (—CN)), nitro group (—NO$_2$), a sulfo group (—SO3H), a thiol group (—SH), or halogen group.

It is considered that the hydrocarbon compound is evaporated and a carbonaceous coating is formed on the carbonaceous material. That is, the hydrocarbon compound becomes gas at the heat-treatment temperature. Therefore, the hydrocarbon compound is not limited, so long as it has a boiling temperature that is a heat-treatment temperature or less, but is preferably 300° C. or less, more preferably 250° C. or less.

(Heat Treatment)

The heat treatment is carried out in a non-oxidizing gas atmosphere containing a hydrocarbon compound. One, or a mixture of two or more of hydrocarbon compounds may be used. A temperature for heat treatment is not limited, so long as the specific surface area of carbonaceous material can be reduced, but is preferably 600 to 1000° C., more preferably 650 to 1000° C., further preferably 700 to 950° C. When the temperature exceeds 1000° C., a deposition rate of a pyrolyzed carbon becomes high, but an evenness of the surface coating may be poor. When the temperature is less than 600° C., a progression of pyrolysis is not sufficient, and thus a coat formation by hydrocarbon compound may be insufficient.

A temperature wherein the hydrocarbon compound is added to non-oxidizing gas is not limited, as long as the hydrocarbon compound can be carbonized by spraying gas or liquid thereof, but preferably 20 to 1000° C., more preferably 30 to 800° C., further preferably 40 to 600° C.

Further, an apparatus used in the heat treatment is not limited, so long as it can apply heat to the carbon precursor while passing the non-oxidizing gas containing the hydrocarbon compound. For example, the heat treatment can be performed by a continuous-type or batch-type in-layer circulating method using a fluidized bed furnace. A supplied amount (circulated amount) of the gas is also not limited, but, for example, is 1 mL/minute or more, preferably 5 mL/minute or more, further preferably 10 mL/minute or more, with respect to 1 g of the plant-derived char carbon precursor.

The non-oxidizing gas includes, but is not limited to, nitrogen or argon.

<<Heat-treatment (Calcination)>>

The heat-treatment (calcination) is a process of heat treatment at a temperature of final heat treatment. That is, the heat-treatment (calcination) is carried out for converting the mixture into the carbonaceous material for non-aqueous electrolyte secondary batteries. The heat-treatment (calcination) can be carried out at 800 to 1600° C. of the final heat treatment temperature under a non-oxidizing gas atmosphere. Further, the heat-treatment (calcination) may include pre-heat-treatment, but it is necessary to carry out the final heat-treatment at the temperature of 800 to 1600° C., in order to obtain the carbonaceous material of the present invention.

For example, the heat-treatment can be performed by (a) the final heat-treatment at a temperature of 800 to 1600° C. In addition, the heat-treatment can be performed by (b) the pre-heat-treatment at a temperature of not less than 350° C. to less than 800° C. and the final heat-treatment at a temperature of 800 to 1600° C. When performing pre-heat-treatment and final heat-treatment, the final heat-treatment may be carried out after the temperature in pre-heat-treatment is reduced, or the final heat-treatment may be carried out by heating to the temperature of final heat-treatment immediately following the pre-heat-treatment. Furthermore, the pre-heat-treatment and final heat-treatment can be performed by a publicly known method in the field of the present invention. For example, they can be performed in accordance with the procedure of the final heat-treatment, or the procedure of the pre-heat-treatment and final heat-treatment described hereinafter in the item "method for manufacturing carbonaceous material for non-aqueous electrolyte secondary batteries"

An atmosphere for the heat-treatment is a non-oxidizing gas (such as nitrogen, argon) atmosphere without oxidizing gas such as an oxygen, in order to prevent an oxidization of the mixture in the heat-treatment. When the heat-treatment temperature is less than 800° C., a carbonization of the mixture is insufficient. Therefore, when the obtained carbonaceous material is used as the electrode material for a secondary battery, the lithium doped in the carbonaceous material cannot be dedoped and remains in the carbonaceous material, and as a result, a non-dedoping capacity is increased, which is not preferable. On the other hand, when the heat-treatment temperature exceeds 1600° C., pores to be doped with lithium are decreased, and as a result, the dope capacity per se is decreased, which is not preferable. Thus, the heat-treatment is performed at preferably 800 to 1600° C., more preferably 1000 to 1500° C., further preferably 1100 to 1400° C.

<<Pulverization>>

In the present invention, the order of the pulverization and mixing of the plant-derived char carbon precursor and the organic compound having a volatile-element of 10 weight % or more in an ignition treatment at 800° C., is not particularly limited, but the pulverization and mixing before final heat-treatment is preferable in the case of (a) the final heat-treatment at 800 to 1600° C. Further, the pulverization and mixing before pre-heat-treatment is preferable in the case of (b) the pre-heat-treatment at a temperature of not less than 350° C. to less than 800° C. and the final heat-treatment at a temperature of 800 to 1600° C.

However, the pulverization and mixing may be performed after the pre-heat-treatment and then the final heat-treatment may be performed, so long as the effect of the present invention can be achieved. Further, the pulverization may be performed before the pre-heat-treatment and then the pulverization may be performed thereafter. That is to say, even if the pulverization and/or mixing are performed after the pre-heat-treatment at a low temperature and/or for a short time, or before or after the pre-heat-treatment at a low temperature and/or for a short time, the effect of the present invention can be achieved. In the case of the embodiments, it is considered that the effect of the present invention may be achieved not by the pre-heat-treatment but by the final heat-treatment. Therefore, these embodiments are included in the above embodiment (a).

In connection to this, it is considered that the effects of the embodiment using the organic compound of the present invention may be achieved by coating a surface of the plant-derived char carbon precursor with the tar components and hydrocarbon gas through the heat-treatment, as described below. Therefore, it is not preferable to pulverize the carbonaceous material obtained by the final heat-treatment from the point of view of the effect of the present invention. However, the pulverization after the final heat-treatment is not excluded, as long as the effect of the present invention can be achieved.

Further, the order of the pulverization and mixing is not particularly limited. Each of the plant-derived char carbon precursor and the organic compound having a volatile-element of 10 weight % or more in an ignition treatment at 800° C. may be separately pulverized, or the mixture thereof may be pulverized. Electrochemical performances of the carbonaceous material are not affected by the order of pulverization.

The pulverizer used for pulverization is not particularly limited, and a jet mill, a rod mill, a ball mill, or a hammer mill, for example, can be used. Further, a plurality of pulverization methods may be used together.

An average particle diameter of the pulverized plant-derived char carbon precursor and/or organic compound having a volatile-element of 10 weight % or more in an ignition treatment at 800° C. is not particularly limited, so long as the effect of the present invention can be achieved, but the average particle diameter thereof may be close to that of the obtained carbonaceous material for non-aqueous electrolyte secondary batteries. Actually, particle sizes of the plant-derived char and/or the carbon precursor are contracted to become particle sizes of 98% to 85% by the heat-treatment. Therefore, a larger average particle diameter is preferable with respect to the average particle diameter of interest. In particular, the average particle diameter is preferably 3.0 to 36.6 μm (3.0 to 36.0 μm in the case of the graphitizable carbon precursor), more preferably 4.0 to 22.8 μm, further preferably 5.0 to 20.4 μm. When the average particle diameter exceeds 36.6 μm (36.0 μm in the case of the graphitizable carbon precursor), the coating of the tar components and hydrocarbon gas may not be sufficient and thus the effect of the present invention may not be achieved. However, in the case of the volatile organic compound having an actual carbon ratio of less than 5 weight % in an ignition treatment at 800° C. and being solid at ordinary temperature, the average particle diameter is not limited to the above range, because it degrades and is evaporated by the heat-treatment.

In the embodiment using the volatile organic compound and the hydrocarbon compound in the present invention, an object of the pulverization is to provide a plant-derived char having 3 to 30 μm of an average particle diameter after the heat-treatment. That is, the plant-derived char is prepared so that the average particle diameter of carbonaceous material of the present invention is 3 to 30 μm. In addition, preferably the plant-derived char is classified. The average particle diameter thereof can be more accurately adjusted by the classification, and particles having a particle diameter of 1 μm or less can be removed thereby.

The plant-derived char (carbon precursor) does not melt through heat treatment. Thus, an order of the pulverization is not particularly limited so long as it is carried out after the demineralization in the gas-phase. However, it is preferably carried out before the heat-treatment. It is for this reason that the specific surface area cannot be sufficiently reduced when the pulverization is performed after the mixing and heat-treatment of the plant-derived char and the volatile organic compound.

However, it is not excluded that the pulverization is carried out after the heat-treatment step.

A grinder used for pulverization is not particularly limited, for example, but a jet mill, a ball mill, a hammer mill, or a rod mill can be used. However, the jet mill with classification means is preferable, from the viewpoint of a decrease in the development of fine particles. On the other hand, when the ball mill, hammer mill, or rod mill is used, the fine particles can be removed by classification after pulverization.

<<Classification>>

The classification may be carried out with or after pulverization. As for the classification, there may be mentioned a classification by sieve, wet type classification, or dry type classification. A wet type classifier includes, for example, one based on the principle of gravitational classification, inertial classification, hydraulic classification, centrifugal classification or the like. Further, a dry type classifier includes, for example, ones based on principle of sedimentation classification, mechanical classification, centrifugal classification, or the like.

In the pulverization, the pulverization and the classification can be carried out using one apparatus. For example, the pulverization and the classification can be carried out by using a jet mill with dry type classification means. Further, an independent classifier and a pulverizer can also be used. In this case, the pulverization and the classification may be continuously or discontinuously carried out.

(Removal of Particles having a Particle Diameter of 1 μm or Less)

In the carbonaceous material of the present invention, it is preferable that particles having a particle diameter of 1 μm or less are removed so that amounts thereof become 3 volume % or less, as mentioned below. An order of the removal of particles having a particle diameter of 1 μm or less is not limited, so long as it is carried out after the pulverization, but it is preferable that the removal is carried out at the same time as the classification in the pulverization.

The particles having a particle diameter of 1 μm or less contained in the carbonaceous material prepared by the manufacturing method of the present invention is 3 volume % or less, more preferably 2.5 volume % or less, further preferably 2.0 volume % or less. The specific surface area thereof is decreased by removing the particles having a particle diameter of 1 μm or less, to thereby obtain non-aqueous electrolyte secondary batteries having a low irreversible capacity.

<<Physical Properties>>

In the embodiment using the organic compound of the present invention, physical properties of the carbonaceous material for non-aqueous electrolyte secondary batteries are not particularly limited, but preferably the carbonaceous material has the following physical properties.

(Specific Surface Area)

An upper limit of specific surface area determined by a bet method is 10 $m^2/g$ or less, preferably 9 $m^2/g$ or less, more preferably 8 $m^2/g$ or less, further preferably 7 $m^2/g$ or less. A lower limit of specific surface area determined by a bet method is not limited, but is preferably 1 $m^2/g$ or more. When the carbonaceous material having a specific surface area of 10 $m^2/g$ or less is used as a negative electrode for non-aqueous electrolyte secondary batteries, the decomposition of an electrolyte solution is decreased and is then a cause for decrease in irreversible capacity. Thus, the battery performance is improved. Further, when the carbonaceous material having a specific surface area of 1 $m^2/g$ or more is used as the negative electrode for non-aqueous electrolyte secondary batteries, the reaction area with an electrolyte solution is increased, and thus, there is a possibility that input/output performances are improved.

On the other hand, in the embodiment using the hydrocarbon compound, an upper limit of specific surface area determined by a bet method is 15 $m^2/g$ or less, preferably 12 $m^2/g$ or less, more preferably 10 $m^2/g$ or less, further preferably 8 $m^2/g$ or less. A lower limit of specific surface area determined by a bet method is not limited, but is preferably 1 $m^2/g$ or more. When the carbonaceous material having a specific surface area of 15 $m^2/g$ or less is used as a negative electrode for non-aqueous electrolyte secondary batteries, the decomposition of an electrolyte solution is decreased and is then a cause for decrease in irreversible capacity. Thus, the battery performance is improved. Further, when the carbonaceous material having a specific surface area of 1 $m^2/g$ or more is used as the negative electrode for non-aqueous electrolyte secondary batteries, the reaction area with an electrolyte solution is increased, and thus, there is a possibility that input/output performances are improved.

(Lc)

The Lc (hexagonal carbon layer) is not particularly limited, but is preferably 3 nm or less, more preferably 0.5 to 2 nm. When the Lc exceeds 3 nm, multiple hexagonal carbon layers are laminated, and thus expansion and contraction of volume caused by the doping and dedoping of lithium are increased. As a result, carbon structures are destroyed to thereby block the doping and dedoping of lithium, and thus the repetition characteristics are poor, which is not preferable for vehicles.

In the embodiment using the graphitizable carbon precursor of the present invention, the Lc (hexagonal carbon layer) is not particularly limited, but is preferably 5 nm or less, more preferably 0.5 to 5 nm, further preferably 0.5 to 3 nm.

(Lc)

(Average (002) Interlayer Spacing $d_{002}$)

An average (002) interlayer spacing ($d_{002}$) is not particularly limited, but is 0.360 to 0.400 nm, preferably 0.365 to 0.390 nm, further preferably 0.375 to 0.390 nm. The carbonaceous material with a small average (002) interlayer spacing of less than 0.360 nm exhibits a large expansion and contraction by the doping and dedoping of lithium to thereby form voids between particles. Therefore, conductive networks are cut off, and thus the repetition characteristics are poor, which is not preferable for vehicles.

(True Density)

The true density $\rho_{Bt}$ determined by the butanol method is not particularly limited, but is preferably a range of 1.40 to 1.80 $g/cm^3$, more preferably 1.40 to 1.70 $g/cm^3$, more preferably 1.40 to 1.65 $g/cm^3$, further preferably 1.40 to 1.55 $g/cm^3$. When the true density is less than 1.40 $g/cm^3$, the doping capacity and dedoping capacity per unit volume become lower, which is not preferable. Further, the true density of 1.80 $g/cm^3$ or more means an increase of order of carbon crystal structure. The average (002) interlayer spacing becomes smaller, and thus an expansion and contraction of structure caused by the doping and dedoping of lithium are increased. Therefore, it is a cause for decrease in irreversible capacity, which is not preferable.

In connection to this, in the embodiment using the graphitizable carbon precursor of the present invention, the true density determined by the butanol method is not particularly limited, but is preferably 1.40 to 1.70 $g/cm^3$ or less, further preferably 1.45 to 1.65 $g/cm^3$.

Further, in the embodiment using the hydrocarbon compound of the present invention, the true density determined by the butanol method is not particularly limited, but is preferably 1.40 to 1.65 $g/cm^3$ or less, further preferably 1.40 to 1.55 $g/cm^3$.

Furthermore, in the embodiment using the volatile organic compound of the present invention, the true density determined by the butanol method is not particularly limited, but is preferably 1.40 to 1.65 g/cm$^3$ or less, further preferably 1.40 to 1.55 g/cm$^3$.

(Average Particle Diameter)

An average particle diameter ($Dv_{50}$) of carbonaceous material for non-aqueous electrolyte secondary batteries of the present invention is preferably 3 to 30 μm. If the average particle diameter is less than 3 μm, fine particles are increased and then the specific surface area of the carbonaceous material is increased. As a result, a reactivity of the carbonaceous material with an electrolytic solution is increased, and then an irreversible capacity which can be used in charging but cannot be used in discharging, is increased. That is, a rate of unusable capacity of a positive electrode is increased, which is not preferable. Further, if a negative electrode is manufactured using the resulting carbonaceous material, each cavity between carbonaceous materials becomes small, and thus a mobility of lithium ions in the electrolyte solution is suppressed. Therefore, it is not preferable. The lower limit of the average particle diameter is preferably 3 μm or more, more preferably 4 μm or more, most preferably 5 μm or more. On the other hand, the average particle diameter of 30 μm or less is preferable. This is because a diffusion-free path of lithium ions in the particle is short, and thus it is possible to rapidly charge and discharge. Further, in order to improve the input/output performances, it is important to enlarge an electrode area in the non-aqueous electrolyte secondary batteries. Thus, it is required to reduce the coating thickness of an active material to a current collector in an electrode preparation. In order to reduce the coating thickness, it is required to reduce the particle diameter of the active material. From this perspective, the upper limit of the average particle diameter is preferably 30 μm or less, more preferably 19 μm or less, further preferably 17 μm or less, further preferably 17 μm or less, further preferably 16 μm or less, most preferably 15 μm or less.

In connection to this, the plant-derived char is contracted about 0 to 20% according to conditions of the heat-treatment. Therefore, in order to obtain the carbonaceous material for non-aqueous electrolyte secondary batteries having a final average particle diameter $Dv_{50}$ of 3 to 30 μm, an average particle diameter of the pulverized carbon precursor is preferably adjusted to larger sizes with about 0 to 20% higher than the final ones. The average particle diameter after the pulverization is not limited, as long as the final average particle diameter becomes 3 to 30 μm. Specifically, however, the average particle diameter $Dv_{50}$ is adjusted to preferably 3 to 36 μm, more preferably 3 to 22.8 μm, further preferably 3 to 20.4 μm, further preferably 3 to 19.2 μm, most preferably 3 to 18 μm.

(Amount of Potassium and Iron)

The amount of potassium of the carbonaceous material for non-aqueous electrolyte secondary batteries of the present invention is preferably 0.1 weight % or less, more preferably 0.05 weight % or less, further preferably 0.03 weight % or less. Further, the amounts of iron is preferably 0.02 weight % or less, more preferably 0.01 weight % or less, further preferably 0.005 weight % or less. If the amount of potassium is higher than 0.1 weight % and the amount of iron is higher than 0.02 weight %, dedoping capacity becomes lower and non-dedoping capacity becomes higher in the non-aqueous electrolyte secondary battery using the obtained carbonaceous material for a negative electrode. In addition to that, when metal elements are eluted to an electrolytic solution and re-deposited, a short circuit may occur. Further, in the non-aqueous electrolyte secondary batteries using a carbonaceous material for a negative electrode having an amount of potassium of more than 0.5 weight %, dedoping capacity may become lower and non-dedoping capacity may become higher. In the non-aqueous electrolyte secondary batteries using a carbonaceous material for a negative electrode having a large amount of iron, there is a possibility that the battery generates heat by occurrences of micro short circuits. Further, there is a possibility that the above carbonaceous material has adverse effects on doping and dedoping performances.

The carbonaceous material of the present invention may be used as the negative electrode for non-aqueous electrolyte secondary batteries. Further, the non-aqueous electrolyte secondary battery containing the negative electrode using the carbonaceous material of the present invention exhibits an excellent dedoping capacity(discharge capacity), non-dedoping capacity (irreversible capacity) and an excellent efficiency.

The negative electrode for non-aqueous electrolyte secondary batteries of the present invention and the non-aqueous electrolyte secondary battery using the same can be manufactured by a publicly known method in the field of the present invention. For example, they can be manufactured according to the method of non-aqueous electrolyte secondary batteries described hereinafter in the item "the method for manufacturing carbonaceous material for non-aqueous electrolyte secondary batteries"

<<Function>>

The mechanism of reducing specific surface area of the carbonaceous material for non-aqueous electrolyte secondary batteries has not been fully elucidated, but is presumed to be as follows. However, the present invention is by no means limited to the following explanation.

It is considered that a carbonaceous coating is formed on a surface of the plant-derived char carbon precursor by the volatile-elements (tar components and hydrocarbon gas) generated from the carbon precursor (non-graphitizable carbon precursor, graphitizable carbon precursor, or mixture thereof) or volatile organic compound during the carbonization step. It is presumed that the specific surface area of the carbonaceous material prepared from the plant-derived char carbon precursor is reduced by the carbonaceous coating, and thus the SEI forming reaction caused by consumption of lithium is suppressed, and as a result, the non-dedoping capacity can be reduced. Further, it is presumed that pores contributing to lithium doping and dedoping are increased by reason of the carbonaceous coating, and an effect of increase of the dedoping capacity is obtained by the new pore forming. Further, it is presumed that, in the present invention, the base material (plant-derived char carbon precursor) and the carbon precursor as the source of the generation of hydrocarbon gas are homogeneously mixed, and therefore a contactual distance between the base material and the generated gas is short, and as a result, the coating is evenly performed.

That is to say, it is considered that the reaction area is decreased by the reduction of specific surface area of the obtained carbonaceous material, and Li$^+$ consumed in the reaction is decreased to thereby cause the increase of dedoping capacity and the increase of non-dedoping capacity.

Further, in the embodiment using the hydrocarbon compound of the present invention, it is considered that the carbonaceous coating is formed on a surface of the plant-derived char carbon precursor by the heat treatment with the vaporized hydrocarbon compound having 1 to 20 carbon atoms. It is presumed that the specific surface area of the carbonaceous material prepared from the plant-derived char carbon precursor is reduced by the carbonaceous coating, and thus the SEI forming reaction caused by consumption of lithium is suppressed, and as a result, the non-dedoping capacity can be reduced. Further, it is presumed that pores contributing to lithium doping and dedoping are increased by reason of the carbonaceous coating, and an effect of increase of the dedoping capacity is obtained by the new pore forming. That is to say, it is considered that the reaction area is decreased by the reduction of a specific surface area of the obtained carbonaceous material, and $Li^+$ consumed in the reaction is decreased to thereby cause the increase of dedoping capacity and the increase of non-dedoping capacity.

[2] Method for Manufacturing Carbonaceous Material for Non-aqueous Electrolyte Secondary Batteries The method for manufacturing carbonaceous material for non-aqueous electrolyte secondary batteries of the present invention comprises the following steps: (1) mixing 35 weight % or more of a plant-derived char demineralized in a gas-phase, and a volatile organic compound having an actual carbon ratio of less than 90 weight % in an ignition treatment at 800° C., and generating a volatile organic compound by a heat treatment, to obtain a mixture comprising them, and (2) subjecting the mixture to heat-treatment.

One embodiment of the manufacturing method of the present invention comprises the following steps: (1) mixing a plant-derived char precursor and a carbon precursor in a ratio by weight of 93:7 to 45:55, to obtain a mixture thereof and (2) subjecting the mixture to heat-treatment.

One embodiment of the manufacturing method of the present invention comprises the following steps: (1) mixing a plant-derived char carbon precursor; and a graphitizable carbon precursor, or a mixture of a non-graphitizable carbon precursor and a graphitizable carbon precursor in a ratio by weight of 95:5 to 42.5:57.5, to obtain a mixture thereof and (2) subjecting the mixture to heat-treatment.

One embodiment of the manufacturing method of the present invention comprises the following steps: (1) mixing a plant-derived char carbon precursor and a graphitizable carbon precursor in a ratio by weight of 96.5:3.5 to 40:60, to obtain a mixture thereof and (2) subjecting the mixture to heat-treatment.

One embodiment of the manufacturing method of the present invention comprises the following steps: (1) mixing a plant-derived char demineralized in a gas-phase, and a volatile organic compound having an actual carbon ratio of less than 5 weight % in an ignition treatment at 800° C. and being solid at ordinary temperature in a ratio by weight of 97:3 to 40:60, to obtain a mixture thereof, and (2) subjecting the mixture to heat-treatment.

One embodiment of the manufacturing method of the present invention comprises the following steps: (1) subjecting a plant-derived char demineralized in a gas-phase to heat treatment at 600 to 1000° C. in a non-oxidizing gas atmosphere containing a vaporized hydrocarbon compound having 1 to 20 carbon atoms, and (2) subjecting the obtained plant-derived char to heat-treatment at 800 to 1600° C. in a non-oxidizing gas atmosphere.

The manufacturing method of the present invention is for obtaining the carbonaceous material wherein the plant-derived char carbon precursor is a base material. Basically, the manufacturing method is for obtaining the non-graphitizable carbonaceous material. However, if the additive amount of the graphitizable carbon precursor is high, physical properties of the resulting carbonaceous material may approach those of the graphitizable carbonaceous material.

In the manufacturing method of the present invention, the plant-derived char demineralized in a gas-phase of 35 weight % or more is used, but the use of 40 weight % or more is preferable. The non-aqueous electrolyte secondary battery having excellent doping and dedoping performances can be obtained by using the plant-derived char demineralized in a gas-phase as the negative electrode of a non-aqueous electrolyte secondary battery.

The carbonaceous material for non-aqueous electrolyte secondary batteries of the present invention can be manufactured through the method for manufacturing a carbonaceous material for non-aqueous electrolyte secondary batteries of the present method. However, the carbonaceous material for non-aqueous electrolyte secondary batteries of the present invention is not manufactured only by the manufacturing method of the present invention, but can be manufactured by alternative manufacturing methods.

<<Demineralization in the Gas-phase>>

In the demineralization in the gas-phase, the plant-derived char is heated at 500° C. to 1250° C. in an inert gas atmosphere containing a halogen compound. Potassium and iron can be effectively removed by demineralization in the gas-phase. Specifically, iron can be effectively removed compared to demineralization in the liquid-phase. Further, alkali metal and alkali earth metal other than potassium can be removed, and further transition metal such as copper or nickel can also be removed. In the manufacturing method of the present invention, the demineralization in the gas-phase may be performed as a "demineralization step in the gas-phase"

The halogen compound used in demineralization in the gas-phase is not particularly limited, for example, there may be mentioned a fluorine, chlorine, bromine, hydrogen fluoride, hydrogen chloride, hydrogen bromide, iodine bromide, chlorine fluoride (ClF), iodine chloride (ICl), iodine bromide (IBr), bromine chloride (BrCl), or the like, compound capable of generating the above halogen compound by pyrolysis, or a mixture thereof, but hydrogen chloride is preferable.

Further, the halogen compound may be mixed with an inert gas and used. The mixed inert gas is not particularly limited, so long as it does not react with carbonaceous material at the treatment temperature. For example, there may be mentioned nitrogen gas, helium gas, argon gas, or krypton gas, or a mixed gas thereof, but nitrogen gas is preferable. Furthermore, it is preferable that a concentration of impure gas, in particular oxygen gas contained in the inert gas, is decreased at the lowest possible level. For example, an acceptable oxygen concentration is 0 to 2000 ppm, more preferably 0 to 1000 ppm.

In demineralization in the gas-phase, a mixture ratio between the inert gas and the halogen compound is not limited, so long as the plant-derived char is sufficiently demineralized. However, an amount of halogen compound with respect to the inert gas is preferably 0.1 to 10.0 volume %, more preferably 0.3 to 5.0 volume %, further preferably 0.5 to 3.0 volume %.

A temperature of demineralization in the gas-phase is 500° C. to 1250° C., preferably 600° C. to 1250° C., more preferably 700° C. to 1250° C., further preferably 800° C. to 1250° C. If the temperature is lower than 500° C., the demineralization efficiency becomes lower and the demineralization may be insufficient. If the temperature is higher than 1250° C., the plant-derived char may be activated by the halogen compound.

Further, a time of demineralization in the gas-phase is not particularly limited, but preferably 5 to 300 minutes, more preferably 10 to 200 minutes, further preferably 30 to 150 minutes.

The amount of potassium after the demineralization in the gas-phase is preferably 0.1 weight % or less, more preferably 0.05 weight % or less, further preferably 0.03 weight % or less. Further, the amounts of iron is preferably 0.02 weight % or less, more preferably 0.015 weight % or less, more preferably 0.010 weight % or less, further preferably 0.005 weight % or less. If the amount of potassium is higher than 0.1 weight % and the amount of iron is higher than 0.02 weight %, dedoping capacity becomes lower and non-dedoping capacity becomes higher in the non-aqueous electrolyte secondary battery using the obtained carbonaceous material for a negative electrode. In addition to that, when metal elements are eluted to an electrolytic solution and re-deposit, a short circuit occurs and thus it sometimes becomes a serious safety problem.

The mechanism of effectively removing potassium, other alkali metal, alkali earth metal, and transition metal have not been fully elucidated, but are presumed to be as follows. Metals such as potassium contained in the plant-derived char are reacted with a halogen compound diffused in the char to become a metallic halide such as chloride or bromide. Then, it is considered that potassium, iron, and the like can be removed by volatilizing (detaching) the generated metallic halide by heat. In the case of the mechanism of the generation of metallic halide by the diffusion of a halogen compound into char and the reaction of metal with the halogen compound, it is considered that potassium and iron are effectively removed due to a high diffusion of a halogen compound in the gas-phase, compared to the demineralization in liquid-phase. However, the present invention is by no means limited to the above explanation.

A particle diameter of the plant-derived char used in demineralization in the gas-phase is not particularly limited. However, if the particle diameter is too small, it becomes difficult to separate the plant-derived char from a gas phase containing the removed potassium. Therefore, the lower limit of the particle diameter is preferably 100 μm or more, more preferably 300 μm or more. The upper limit of the particle diameter is preferably 10000 μm or less, more preferably 8000 μm or less, further preferably 5000 μm or less.

Further, an apparatus used in demineralization in the gas-phase is not limited, so long as it can heat a mixed gas of inert gas and a halogen compound while mixing them. However, for example, demineralization in the gas-phase can be performed by a continuous-type or batch-type in-layer circulating method using a fluidized bed furnace. A supplied amount (circulated amount) of the mixed gas is also not limited, but, for example, is 1 mL/minute or more, preferably 5 mL/minute or more, further preferably 10 mL/minute or more per 1 gram of the plant-derived char.

In demineralization in the gas-phase, it is preferable that heat treatment in the absence of a halogen compound (hereinafter sometimes referred to as "halogen-absent heat treatment") is carried out after the heat treatment in the inert gas atmosphere containing a halogen compound (hereinafter sometimes referred to as "halogen heat treatment"). That is, a halogen is contained in the carbon precursor by the halogen heat treatment, and thus it is preferable that a halogen contained in the carbon precursor is removed by halogen-absent heat treatment. In particular, the halogen-absent heat treatment is carried out by heating the carbon precursor in an inert gas atmosphere without a halogen compound at 500° C. to 1250° C. Preferably, a temperature of the heat treatment in the absence of a halogen compound is the same temperature as the first heat treatment in the inert gas atmosphere containing a halogen compound, or is higher than the temperature thereof. For example, a halogen can be removed therefrom by carrying out heat treatment while cutting off the halogen compound supply, after the halogen heat treatment. A time of halogen-absent heat treatment is not particularly limited, but preferably 5 to 300 minutes, more preferably 10 to 200 minutes, further preferably 10 to 100 minutes. In the present specification, the plant-derived char demineralized in the gas-phase, obtained by the above procedure is sometimes referred to as "plant-derived char-carbon precursor".

<<Mixing Step>>

In the mixing step, the plant-derived char carbon precursor and the organic compound are mixed.

In an embodiment using the carbon precursor, the plant-derived char carbon precursor and the carbon precursor are mixed in a ratio by weight of 95:5 to 45:55, and preferably in a ratio by weight of 93:7 to 45:55, in this step. The ratio by weight of the plant-derived char carbon precursor and the carbon precursor is more preferably 90:10 to 50:50, most preferably 85:15 to 65:35.

In an embodiment using the graphitizable carbon precursor, or the mixture of the non-graphitizable carbon precursor and the graphitizable carbon precursor, the plant-derived char carbon precursor and the mixture of the non-graphitizable carbon precursor and the graphitizable carbon precursor may be mixed in a ratio by weight of 95:5 to 42.5:57.5, in this step. The ratio by weight of the plant-derived char carbon precursor and the carbon precursor is more preferably 90:10 to 50:50, most preferably 85:15 to 65:35.

In an embodiment using the graphitizable carbon precursor, the plant-derived char carbon precursor and the graphitizable carbon precursor may be mixed in a ratio by weight of 96.5:3.5 to 40:60, in this step. The ratio by weight of the plant-derived char carbon precursor and the carbon precursor is more preferably 96:4 to 45:55, most preferably 95:5 to 50:50.

In connection to this, the pulverization of the plant-derived char carbon precursor and the carbon precursor may be performed before or after the mixing step.

In an embodiment using the volatile organic compound, the plant-derived char carbon precursor and the volatile organic compound may be mixed in a ratio by weight of 97:3 to 40:60, in this step. The ratio by weight of the plant-derived char demineralized in a gas-phase and the volatile organic compound is more preferably 95:5 to 60:40, further preferably 93:7 to 80:20. For example, when the amount of the volatile organic compound is 3 parts by weight or more, the specific surface area can be sufficiently reduced. On the other hand, if the amount of the volatile organic compound exceeds 60 parts by weight, the reductive effects of specific surface area are saturated, and thus the volatile organic compound is wasted.

Mixing may be performed in a step before or after a step of pulverization of the plant-derived char carbon precursor. In the case where the mixing is performed before the step of pulverization of the plant-derived char carbon precursor, the pulverization and mixing can be simultaneously performed by simultaneously supplying the plant-derived char and the volatile organic compound to pulverizing equipment while weighing them on a scale.

Further, the mixing is preferably carried out after the pulverization of the plant-derived char carbon precursor. In this case, mixing methods are not limited so long as both can be homogeneously mixed. The volatile organic compound is preferably mixed in a particle form, but particle shape and particle diameter are not particularly limited. From the point of view that the volatile organic compound is evenly dispersed in the pulverized, plant-derived char carbon precursor, an average particle diameter is preferably 0.1 to 2000 μm, more preferably 1 to 1000 μm, further preferably 2 to 600 μm.

In the present invention, the mixture may comprise other components other than the plant-derived char carbon precursor, the carbon precursor, and the volatile organic compound so long as the effects in the resulting carbonaceous material for non-aqueous electrolyte secondary batteries of the present invention are obtained, i.e. the specific surface area of the carbonaceous material is reduced. For example, the mixture can comprise natural graphites, synthetic graphites, metallic materials, alloy materials, or oxide materials.

<<Heat Treatment Step>>

In the heat treatment step of the manufacturing method of the present invention, the specific surface area of the plant-derived char carbon precursor is reduced. The heat treatment step is carried out by heat treating the plant-derived char carbon precursor under a non-oxidizing gas atmosphere containing one or more vaporized hydrocarbon compounds having 1 to 20 carbon atoms, at 600~1000° C.

Heat treatment temperature is not limited, so long as the specific surface area of the plant-derived char carbon precursor can be reduced, but is preferably 600 to 1000° C., more preferably 650 to 1000° C., further preferably 700 to 950° C. When the temperature exceeds 1000° C., a deposition rate of a pyrolyzed carbon becomes high, but an evenness of the surface coating may be poor. When the temperature is less than 600° C., a progression of pyrolysis is not sufficient, and thus a coat formation by hydrocarbon compound may be insufficient.

A temperature wherein a hydrocarbon compound is added to a non-oxidizing gas is not limited, as long as the organic compound can be carbonized by spraying gas or liquid thereof, but preferably 20 to 1000° C., more preferably 30 to 800° C., further preferably 40 to 600° C.

Further, an apparatus used in the heat treatment is not limited, so long as it can apply heat to the plant-derived char carbon precursor while passing the non-oxidizing gas containing a hydrocarbon compound having 1 to 20 carbon atoms or a heterocyclic compound. For example, the heat treatment can be performed by a continuous-type or batch-type in-layer circulating method using a fluidized bed furnace. A supplied amount (circulated amount) of the gas is also not limited, but, for example, is 1 mL/minute or more, preferably 5 mL/minute or more, further preferably 10 mL/minute or more, with respect to 1 g of the plant-derived char carbon precursor. Nitrogen or argon can be used as the non-oxidizing gas. For example, an additive amount of the hydrocarbon compound having 1 to 20 carbon atoms to the non-oxidizing gas is preferably 0.1 to 50 volume %, more preferably 0.5 to 25 volume %, further preferably 1 to 15volume %.

<<Heat-treatment Step (Calcination Step)>>

In the heat-treatment step in the manufacturing method of the present invention, a heat-treatment is performed at a final heat-treatment temperature after a heating process from a room temperature to the predetermined, final heat-treatment temperature. The heat-treatment step may be performed by (a) subjecting the pulverized mixture to the final heat-treatment at 800 to 1600° C.; or by (b) subjecting the pulverized mixture to pre-heat-treatment at no less than 350° C. to less than 800° C. and the final heat-treatment at 800 to 1600° C. An example of the procedure of the pre-heat-treatment and final heat-treatment will be explained as follows.

(Pre-heat-treatment (Pre Calcination))

The pre-heat-treatment in the manufacturing method of the present invention can be performed, for example, by heat treating the pulverized mixture at a temperature of at least 300° C. and less than 800° C. For example, volatile matter such as $CO_2$, $COCH_4$, and $H_2$, and tar content, are removed by pre-heat treatment. Thus, the generation of these components can be reduced and the load of the furnace can be reduced in the final heat-treatment. A lower limit of the pre-heat-treatment temperature of the pulverized mixture is 350° C. or more, preferably 400° C. or more. Pre-heat treatment is performed according to the conventional procedures of the pre-heat-treatment. In particular, the pre-heat treatment is performed in an inert gas atmosphere, and examples of inert gases include nitrogen, argon, or the like. In addition, pre-heat treatment can be performed under reduced pressure at a pressure of 10 kPa or less, for example. The time of pre-heat treatment is not particularly limited, but, for example, pre-heat treatment may be performed for 0.5 to 10 hours, and is preferably performed for 1 to 5 hours.

In connection to this, when the pre-heat-treatment is carried out in the manufacturing method of the present invention, it is considered that the plant-derived char carbon precursor may be coated with the tar component and hydrocarbon gas in the pre-heat-treatment step.

(Final Heat-treatment (Final Calcination))

The final heat-treatment in the manufacturing method of the present invention can be carried out according to a conventional procedure of the final heat treatment. The carbonaceous material for non-aqueous electrolyte secondary batteries can be obtained by performing the final heat treatment. In particular, the temperature of the final heat treatment of the pulverized mixture is 800 to 1600° C., preferably 1000 to 1500° C., more preferably 1100 to 1450° C., further preferably 1100~1400° C. The final heat treatment is performed in an inert gas atmosphere. Examples of inert gases include nitrogen, argon, or the like. Further, the final heat treatment can be performed in an inert gas atmosphere containing a halogen gas. In addition, final heat-treatment can be performed under reduced pressure at a pressure of 10 kPa or less, for example. The final heat treatment time is not particularly limited. However, for example, the final heat treatment can be performed for 0.05 to 10 hours, preferably for 0.05 to 8 hours, and more preferably for 0.05 to 6 hour. The upper limit of the final heat treatment time is preferably 3 hours, most preferably 1 hour.

In connection to this, when the pre-heat-treatment is not carried out in the manufacturing method of the present invention, it is considered that the plant-derived char carbon precursor may be coated with the tar component and hydrocarbon gas in the final heat-treatment step.

<<Pulverization>>

The pulverization is carried out so that the particle diameter of the plant-derived char carbon precursor and the carbon precursor (non-graphitizable carbon precursor, graphitizable carbon precursor, or mixture thereof) is adjusted to a suitable particle diameter as the negative electrode material and preferably to a homogeneous particle diameter. The pulverizer used for pulverization is not particularly limited, but a jet mill, a rod mill, a ball mill, or a hammer mill, for example, can be used. Further, many pulverization methods may be used together. In the present invention, the pulverization may be performed as a "pulverization step".

The order of the pulverization is not limited, so long as the effects of the present invention can be achieved. Preferably, the pulverization may be performed before the mixing step (1), between the mixing step (1) and the heat-treatment (calcination) step (2), or between the pre-heat-treatment and the final heat-treatment in the heat-treatment (calcination) step (2). However, it is not excluded that the pulverization is carried out after the heat-treatment (calcination) step.

<<Classification>>

As for the classification, there may be mentioned a classification by sieve, wet type classification, or dry type classification. A wet type classifier includes, for example, one based on the principle of gravitational classification, inertial classification, hydraulic classification, centrifugal classification or the like. Further, a dry type classifier includes, for example, ones based on principle of sedimentation classification, mechanical classification, centrifugal classification, or the like.

In the pulverizing step, the pulverization and the classification can be carried out using one apparatus. For example, the pulverization and the classification can be carried out by using a jet mill with dry type classification means. Further, an independent classifier and a pulverizer can also be used. In this case, the pulverization and the classification may be continuously or discontinuously carried out.

(Removal of Particles having a Particle Diameter of 1 μm or Less)

In the manufacturing method of the present invention, it is preferable that particles having a particle diameter of 1 μm are removed so that amounts thereof become 3 volume % or less. An order of the removal of particles having a particle diameter of 1 μm or less is not limited, so long as it is carried out after the pulverization, but it is preferable that the removal is carried out at the same time as the classification in the pulverization.

The particles having a particle diameter of 1 μm or less contained in the carbonaceous material prepared by the manufacturing method of the present invention is 3 volume % or less, more preferably 2.5 volume % or less, further preferably 2.0 volume % or less. The specific surface area thereof is decreased by removing the particles having a particle diameter of 1 μm or less, to thereby obtain non-aqueous electrolyte secondary batteries having a low irreversible capacity.

[3] Negative Electrode for Non-aqueous Electrolyte Secondary Batteries

The negative electrode for non-aqueous electrolyte secondary batteries of the present invention contains the carbonaceous material for a negative electrode of non-aqueous electrolyte secondary batteries of the present invention.

<<Preparation of Negative Electrode>>

The negative electrode using the carbonaceous material of the present invention can be prepared as follows. A binder is added to the carbonaceous material and then appropriate solvent is added thereto in an appropriate amount. The mixture is kneaded so as to be an electrode mixture. Subsequently, the electrode mixture is applied to an current collector such as a metal plate, dried, and press-formed, to obtain the negative electrode. An electrode having high conductivity can be produced by using the carbonaceous material of the present invention without particularly adding a conductivity agent, but a conductivity agent may be added as necessary when preparing the electrode mixture for the purpose of imparting even higher conductivity. Conductive carbon black, vapor growth carbon fiber (VGCF), carbon nanotubes, or the like can be used as a conductivity agent. The added amount of the conductivity agent differs depending on the type of conductivity agent that is used, but when the added amount is too small, the expected conductivity cannot be achieved, which is not preferable. Conversely, when the added amount is too large, the dispersion of the conductivity agent in the electrode mixture becomes poor, which is also not preferable. From this perspective, the proportion of the added amount of the conductivity agent is preferably from 0.5 to 10 weight % (here, it is assumed that the active material (carbonaceous material) +the amount of the binder+the amount of the conductivity aid=100 weight %), more preferably from 0.5 to 7 weight %, and particularly preferably from 0.5 to 5 weight %. The binders are not particularly limited as long as the binders (such as PVDF (polyvinylidene fluoride), polytetrafluoroethylene, and the mixture of SBR (styrene-butadiene rubber) and CMC (carboxymethylcellulose)) do not react with electrolyte solutions. Of these, PVDF is preferable in that the PVDF adhering to the active material surface minimally inhibits lithium ion movement and in that favorable input/output performances can be achieved. A polar solvent such as N-methyl pyrrolidone (NMP) is preferably used to dissolve PVDF and form a slurry, but an aqueous emulsion such as SBR or CMC may also be dissolved in water. When the added amount of the binder is too large, the electrical resistance of the resulting electrode becomes high, and the internal resistance of the battery also becomes high. This diminishes the battery performances, which is not preferable. When the added amount of the binder is too small, the bindings between the negative electrode active material particles, and the binding between the negative electrode active material particles and the current collector, become insufficient, which is not preferable. The preferable amount of the binder that is added differs depending on the type of binder that is used. In the case of a PVDF-type binder, the added amount is preferably 3 to 13 weight %, more preferably 3 to 10 weight %. On the other hand, in the case of a binder using water as a solvent, a plurality of binders such as a mixture of SBR and CMC are often used in combination, and the total amount of all of the binders that are used is preferably 0.5 to 5 weight % and more preferably 1 to 4 weight %. The electrode active material layer is typically formed on both sides of the current collector, but the layer may be formed on just one side as necessary. The amount of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable. The thickness of the active material layer (on each side) is preferably from 10 to 80 μm, more preferably from 20 to 75 μm, and most preferably from 20 to 60 μm.

[4] Non-aqueous Electrolyte Secondary Battery

The non-aqueous electrolyte secondary battery of the present invention contains the negative electrode for non-aqueous electrolyte secondary batteries of the present invention. The non-aqueous electrolyte secondary battery containing the negative electrode for non-aqueous electrolyte secondary batteries using the carbonaceous material of the present invention exhibits an excellent output performance and an excellent cycle performance.

<<Manufacture of Non-aqueous Electrolyte Secondary Battery>>

When a negative electrode for a non-aqueous electrolyte secondary battery is formed using the negative electrode material of the present invention, the other materials constituting the battery such as the positive electrode material, separators, and the electrolyte solution are not particularly limited, and various materials that have been conventionally used or proposed for non-aqueous solvent secondary batteries can be used.

For example, layered oxide-based (as represented by $LiMO_2$, where M is a metal such as $LiCoO_2$, $LiNiO_2$, $LiMnO_2$, or $LiNi_xCo_yMo_zO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable as positive electrode materials, and these chalcogen compounds may be mixed as necessary. A positive electrode is made by forming these positive electrode materials with an appropriate binder together with a carbon material for imparting conductivity to the electrode and forming a layer on an current collector.

A non-aqueous electrolyte solution used with this positive electrode and negative electrode combination is typically formed by dissolving an electrolyte in a non-aqueous solvent. For example, one, or a combination of two or more of organic solvents such as propylene carbonate, ethylene carbonate, dimethyl carbonate, diethyl carbonate, dimethoxyethane, diethoxyethane, γ-butyl lactone, tetrahydrofuran, 2-methyl tetrahydrofuran, sulfolane, or 1,3-dioxolane, may be used as a non-aqueous solvent. In addition, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$, or the like is used as an electrolyte. A secondary battery is typically formed by making a positive electrode layer and a negative electrode layer formed, as described above, by facing one another via a liquid-permeable separator made of a nonwoven fabric or another porous material as necessary, and immersing the product in an electrolyte solution. A permeable separator made of a nonwoven fabric or another porous material ordinarily used in secondary batteries can be used as a separator. Alternatively, a solid electrolyte formed from a polymer gel impregnated with an electrolyte solution may be used instead of or together with a separator.

[5] Vehicle

For example, the non-aqueous electrolyte secondary batteries of the present invention are suitable for batteries (typically, non-aqueous electrolyte secondary batteries for vehicle-driving) mounted in vehicles such as an auto car. The vehicle of the present invention is not particularly limited, for example, there may be mentioned a vehicle which is generally known as an electric vehicle, a hybrid car between the electrical battery and fuel battery, internal-combustion engine, or the like. However, the vehicle has at least a power unit containing the above battery, an electrical drive system which is driven by electrical supply from the power unit, and a control unit for controlling the electrical drive system. Further, it may have a charge system wherein a damping energy is converted into electrical energy by a dynamic brake or regeneration brake, and then the non-aqueous electrolyte secondary battery is charged with the converted electrical energy.

EXAMPLES

The present invention will now be further illustrated by, but is by no means limited to, the following Examples.

In addition, the measurement methods for the physical properties of the carbonaceous material for non-aqueous electrolyte secondary batteries of the present invention (the "true density determined by butanol method", the "specific surface area by nitrogen adsorption", the "atom ratio of hydrogen/carbon (H/C)", the "measurement of average (002) interlayer spacing d002 and Lc(002) determined by X-ray diffractometry", "measurement of Lc(002) determined by X-ray diffractometry", the "average particle diameter as determined by laser diffraction", the "measurement of actual carbon ratio", the "Mineral content", and the measurement of potassium amount determined by fluorescent X-ray analysis) will be described hereinafter, but the physical properties described in this specification are based on values determined by the following methods.

<<True Density $\rho_{Bt}$ Determined by Butanol Method>>

The true density was measured by butanol method in accordance with the method prescribed in JIS R7212.

The mass (ml) of a pycnometer with a bypass line having an internal volume of approximately 40 mL was precisely measured. Next, after a sample was placed flat at the base of the bottle so as to have a thickness of approximately 10 mm, the mass (m2) was precisely measured. Next, 1-butanol was slowly added to the bottle to a depth of approximately 20 mm from the base. Next, the pycnometer was gently oscillated, and after it was confirmed that no large air bubbles were formed, the bottle was placed in a vacuum desiccator and gradually evacuated to a pressure of 2.0 to 2.7 kPa. The pressure was maintained for 20 minutes or longer, and after the generation of air bubbles stops, the bottle was removed and further filled with 1-butanol. After a stopper was inserted, the bottle was immersed in a constant-temperature water bath (adjusted to 30±0.03° C.) for at least 15 minutes, and the liquid surface of 1-butanol was aligned with the marked line. Next, the bottle was removed, and after the outside of the bottle was thoroughly wiped and the bottle was cooled to room temperature, the mass (m4) was precisely measured. Next, the same pycnometer was filled with 1-butanol alone and immersed in a constant-temperature water bath in the same manner as described above. After the marked line was aligned, the mass (m3) was measured. In addition, distilled water which was boiled immediately before use and from which the dissolved gas was removed was placed in the pycnometer and immersed in a constant-temperature water bath in the same manner as described above. After the marked line was aligned, the mass (m5) was measured. The true density (ρB) was calculated using the following formula.

$$\rho_{Bt} = \frac{m_2 - m_1}{m_2 - m_1 - (m_4 - m_3)} \times \frac{m_3 - m_1}{m_5 - m_1} d \quad \text{[Math. 3]}$$

(Here, d is the specific gravity (0.9946) in water at 30° C.)

<<Specific Surface Area by Nitrogen Adsorption>>

An approximate equation derived from the BET equation is described below.

$$v_m = \frac{1}{\{v(1-x)\}} \quad \text{[Math. 4]}$$

Using the above approximate equation, $v_m$ at the liquid nitrogen temperature was obtained according to the single point method (relative pressure x=0.3) using nitrogen adsorption, and a specific surface area of the sample was calculated with the following equation.

$$\text{Specific surface area} = 4.35 \times v_m \left(\frac{m^2}{g}\right) \qquad \text{[Math. 5]}$$

In this case, $v_m$ represents the amount of adsorption (cm³/g) required for forming a monomolecular layer on the sample surface; v represents the amount of adsorption (cm³/g) that is actually measured; and x represents a relative pressure.

Specifically, the amount of adsorption of nitrogen to a carbon material at the liquid nitrogen temperature was measured as described below, using a "Flow Sorb II2300" manufactured by Micromeritics Instrument Corp. A carbon material pulverized to a particle diameter of about 5 to 50 µm was filled in a sample tube, and the sample tube was cooled to −196° C. while a mixed gas of helium:nitrogen=80:20 was streamed therein. Thus, nitrogen is adsorbed to the carbon material. Next, the sample tube is returned to room temperature. At this time, the amount of nitrogen desorbed from the sample was measured with a thermal conductivity type detector, and the result was designated as the amount of adsorbed gas, v.

Meanwhile, the specific surface areas of the carbonaceous materials obtained in Examples 19 to 23 and Comparative Example 11 were measured by the following method.

A sample tube was filled with 0.1 g of a sample, and the sample was subjected to a pretreatment for 5 hours at 300° C. under reduced pressure. Measurement of a nitrogen adsorption isotherm was carried out for the sample at the liquid nitrogen temperature using a specific surface area/pore distribution analyzer ("BELSORP 285A" manufactured by Bel Japan, Inc.). The specific surface area was determined from the adsorption isotherm thus obtained, using a BEL analyzing software (version 4.0.13), by selecting two points at which the correlation coefficient is the highest from a relative pressure of 0.01 or less and from between relative pressures of 0.05 and 0.1.

<<Atom Ratio (H/C) of Hydrogen Atoms to Carbon Atoms>>

The atom ratio was determined from the weight proportions of hydrogen and carbon in a sample obtainable by an elemental analysis using a CHN analyzer, as a ratio of the number of atoms of hydrogen to carbon.

<<Average (002) Interlayer Spacing $d_{002}$ Determined by X-ray Diffractometry>>

A carbon material powder is filled in a sample holder, and an X-ray diffraction chart is obtained by using CuKα radiation that has been monochromatized by a Ni filter, as a radiation source. A peak position in the diffraction chart is determined by the centroid method (a method of determining a centroidal position of a diffraction line and determining a peak position as a 2θ value corresponding thereto), and the peak position is corrected using the diffraction peak of the (111) plane of a high purity silicon powder for standard material. The wavelength of the CuKα radiation is designated as 0.15418 nm, and the value of $d_{002}$ is calculated by the Braggs formula described below.

$$d_{002} = \frac{\lambda}{2 \cdot \sin\theta} \text{ (Bragg's formula)} \qquad \text{[Math. 6]}$$

<<Calculation of Lc(002) by X-ray Diffractometry>>

The Lc(002) is calculated by substituting the following variables into Scherrer's formula.

$$L = K\lambda/(\beta \cdot \cos\theta) \qquad \text{(Scherrer's formula)}$$

K: shape factor (0.9), λ: wavelength of X-radiation (CuKαm=0.15418 nm), θ: diffraction angle, β: full width at half maximum <<Average Particle Diameter Determined by Laser Diffraction>>

A dispersant (surfactant SN WET 366 (manufactured by San Nopco, Ltd.)) was added to a sample, and the mixture was thoroughly mixed. Next, pure water was added thereto, and the mixture was dispersed by ultrasonication. Subsequently, the particle size distribution in the particle size range of 0.5 to 3000 µm was determined using a particle size distribution analyzer (manufactured by Shimadzu Corp., "SALD-3000S") at a refractive index set to 2.0 to 0.1 i.

Particle sizes at which the cumulative volume was 90%, 50%, and 10% determined from a particle size distribution of $Dv_{90}$ (µm), average particle diameter $Dv_{50}$ (µm), and $Dv_{10}$ (µm), respectively, were designated as $Dv_{90}$, average particle diameter $Dv_{50}$, and $Dv_{10}$.

<<Particle Size Distribution of Carbonaceous Material>>

The particle size distributions of the carbonaceous materials obtained in Examples 19 to 23 and Comparative Example 11 were measured by the following method.

A sample was introduced into an aqueous solution containing a surfactant ("Triton X-100" manufactured by Wako Pure Chemical Industries, Ltd.) at 0.3% by mass, and the aqueous solution was treated with an ultrasonic cleaner for 10 minutes or longer to disperse the sample in the aqueous solution. The particle size distribution was measured using this dispersion liquid. Measurement of the particle size distribution was carried out using a particle size distribution analyzer ("MICROTRAC MT3000" manufactured by Nikkiso Co., Ltd.). The method for determining d50 was as follows.

Method for determining d50: Particle diameter at which the cumulative volume is 50% (=average particle diameter)]

<<Measurement of Actual Carbon Ratio>>

The actual carbon ratio was measured by igniting a sample in an inert gas and then quantitating a carbon amount of residue on ignition. About 1 g of volatile organic compound (accurate weight of the volatile organic compound is defined as "$W_1$ (g)") was charged into a crucible, and the crucible was heated to 800° C. at a rate of 10° C./h in an electric furnace while flowing nitrogen gas at a rate of 20 liters/min. Subsequently, it was ignited at 800° C. for 1 hour. A weight of the remaining matter was defined as the residue on ignition ($W_2$(g)).

Next, elements of the above residue on ignition was analyzed in accordance with the method defined in JIS M8819, and a weight ratio of carbon ($P_1$(%)) was determined. The actual carbon ratio ($P_2$(%)) was calculated by the following equation.

$$P_2 = P_1 \times \frac{W_2}{W_1} \qquad \text{[Math. 1]}$$

<<Mineral Content>>

In order to measure potassium content and iron content, a carbon sample containing predetermined amounts of potassium and iron was prepared, and then standard curves showing relationships between an intensity of potassiumKα ray and potassium content, and an intensity of ironKα ray and iron content were prepared by measuring the carbon sample using an X-ray fluorescence spectrometer. Next, potassiumKα ray and ironKα ray intensities of a sample to be tested were measured, and the potassium content and iron content of the sample were calculated from the prepared standard curves. Fluorescent X-ray analysis was carried out using LAB CENTER XRF-1700 [Shimadzu Corporation] in accordance with the following conditions. A holder for an upper-irradiated system was used, and a measured area of a sample was defined as an inside of circle of said holder with a diameter of 20 mm. The sample to be tested was placed by putting 0.5 g of a sample to be tested into a polyethylene container having an inner diameter of 25 mm and sealing an underside of the polyethylene container by plankton net. A measurement surface thereof was covered with a polypropylene film, and then the sample was measured. The conditions of the X-ray source were defined as 40 kV and 60 mA. Potassium content was measured by using LiF(200) as a dispersive crystal and gas-flow type proportional counter as a detector, and the sample was scanned in the ranges of 90 to 140° (2θ) at 8°/min of scan speed. Iron content was measured by using LiF(200) as a dispersive crystal and scintillation counter as a detector, and the sample was scanned in the ranges of 90 to 140° (2θ) at 8°/min of scan speed.

Referential Example 1

Nitrogen gas containing 1 volume % of hydrogen chloride gas was supplied at a flow rate of 10 L/minute to 100 g of the palm shell char A with a diameter of 2.360 to 0.850 mm (containing 98 weight % of particles with diameter of 2.360 to 0.850 mm) which was obtained by crushing palm shells and carbonizing the crushed palm shells at 500° C. After the above treatment for 80 minutes at 950° C., only the hydrogen chloride gas supply was cut off, and further the resulting palm shell char A was treated for 30 minutes at 950° C. to obtain the heat treated-palm shell carbon. The resulting heat treated -palm shell carbon was preliminarily pulverized by ball mill to become pre-pulverized carbon with an average particle diameter of 8 μm, and the resulting carbon was pulverized and classified by a compact jet mill (Co-Jet System α-mkIII). The resulting powdery carbon precursor was placed in a horizontal, tubular furnace and subjected to final heat treatment at 1200° C. for 1 hour under a nitrogen atmosphere to obtain the carbonaceous material for a negative electrode of non-aqueous electrolyte secondary batteries with an average particle diameter of 7 μm. The conditions of demineralization and heat treatment and the physical properties of the resulting carbonaceous material are shown in Table 1. The resulting carbonaceous material was excellent in removal efficiencies of iron compared to the carbonaceous material obtained by the demineralization in liquid-phase in Referential Example 2.

Referential Example 5

The palm shell chars were subjected to pre-heat treatment at 600° C. in a nitrogen gas atmosphere (normal pressure), and pulverized to prepare a powdery carbon precursor having an average particle diameter of 19 μm. Next, the powdery carbon precursor was immersed in a 35% hydrogen chloride solution for 1 hour, and then a demineralizing treatment was carried out by twice repeating the washing with boiling water for 1 hour, to thereby obtain the demineralized powdery carbon precursor. 10 g of the resulting, demineralized powdery carbon precursor was placed in a horizontal tubular furnace and subjected to final heat treatment at 1200° C. for 1 hour under a nitrogen atmosphere to prepare the comparative carbonaceous material. As shown in Table 1, the amount of potassium is 0.049 weight % or less, and the amount of iron is 0.059 weight % or less. That is, the removal efficiencies of potassium and iron is lower, compared to the carbonaceous materials obtained by the demineralization in the gas-phase.

Referential Example 3

The procedure described in Referential Example 1 was repeated, except that the amount of particles having a particle diameter of 1 μm or less was 2.5% by changing a classification point in the pulverization, to obtain the referential carbonaceous material 3.

Referential Example 4

The procedure described in Referential Example 1 was repeated, except that the the amount of particles having a particle diameter of 1 μm or less was 4.2% by changing a classification point in the pulverization, to obtain the referential carbonaceous material 4.

Electrodes and non-aqueous electrolyte secondary batteries were prepared by using the carbon materials obtained in the above Referential Examples 1, 3, and 4, and the electrode performances thereof were evaluated, as follows.

<<Doping/dedoping Capacity for Active Material>>

(a) Preparation of an Electrode 90 parts by weight of the carbon material as described above and 10 parts by weight of polyvinylidene fluoride ("KF#1100" made by KUREHA CORPORATION) were formed together with NMP into a paste composition, and then the composition was evenly applied onto a copper foil. After being dried, the coating electrode was punched into a disc with a diameter of 15 mm from the copper foil, and it was pressed to prepare the positive electrode. The amount of carbon material in an electrode was adjusted to approximately 10 mg.

(b) Preparation of a Test Battery

The carbonaceous material of the present invention is suited to constitute a negative electrode of a non-aqueous electrolyte secondary battery. However, in order to precisely evaluate the discharge capacity (de-doping capacity) and irreversible capacity (non-dedoping capacity) of a battery active material without being affected by a fluctuation in the performances of a counter electrode, a lithium secondary battery was formed using the electrode obtained above together with a counter electrode comprising lithium metal with stable characteristics, and the characteristics thereof were evaluated.

The lithium electrode was prepared in a glove box of an Ar atmosphere. An electrode (counter electrode) was formed by spot-welding a stainless steel mesh disc with a diameter of 16 mm on the outer lid of a 2016-size coin-type battery can in advance, stamping a thin sheet of metal lithium with a thickness of 0.8 mm into a disc shape with a diameter of 15 mm, and pressing the thin sheet of metal lithium into the stainless steel mesh disc.

Using a pair of electrodes produced in this way, $LiPF_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine, porous membrane separator made of borosilicate glass fibers with a diameter of 19 mm to assemble a 2016-size coin-type, non-aqueous electrolyte lithium secondary battery in an Ar glove box.

(c) Measurement of Battery Capacity

Charge-discharge tests were performed on a lithium secondary battery with the configuration described above using a charge-discharge tester ("TOSCAT" made by Toyo System Co., Ltd.). A lithium doping reaction for inserting lithium into the carbon electrode was performed with a constant-current/constant-voltage method, and a de-doping reaction was performed with a constant-current method. Here, in a battery using a lithium chalcogen compound for the positive electrode, the doping reaction for inserting lithium into the carbon electrode is called "charging", and in a battery using lithium metal for a counter electrode, as in the test battery of the present invention, the doping reaction for the carbon electrode is called "discharging". The manner in which the doping reactions for inserting lithium into the same carbon electrode thus differs depending on the pair of electrodes used. Therefore, the doping reaction for inserting lithium into the carbon electrode will be described as "charging" hereinafter for the sake of convenience. Conversely, "discharging" refers to a charging reaction in the test battery but is described as "discharging" for the sake of convenience since it is a de-doping reaction for removing lithium from the carbon material. The charging method used here is a constant-current/constant-voltage method. Specifically, constant-current charging was performed at 0.5 mA/cm$^2$ until the terminal voltage reached 0 V. After the terminal voltage reached 0 mV, constant-voltage charging was performed at a terminal voltage of 0 mV, and charging was continued until the current value reached 20 µA. At this time, a value determined by dividing the electricity supply by the weight of the carbon material of the electrode is defined as the charge capacity per unit weight of the carbon material (mAh/g). After charging completed, the battery circuit was opened for 30 minutes, and discharging was performed thereafter. Discharging was performed at a constant current of 0.5 mA/cm$^2$ until the final voltage reached 1.5 V. At this time, a value determined by dividing the electrical discharge by the weight of the carbon material of the electrode is defined as the discharge capacity per unit weight of the carbon material (mAh/g). The irreversible capacity was calculated as the discharge capacity subtracted from the charge capacity.

The charge-discharge capacity and irreversible capacity were determined by averaging n=3 measurements for test batteries produced using the same sample.

In the non-aqueous electrolyte secondary batteries using the carbonaceous materials obtained in Referential Examples 1, 3, and 4, the irreversible capacity increased with the increase of the particles having a diameter of less than 1 µm, i.e. 0 volume %, 2.5 volume %, and 4.2 volume %, respectively. That is to say, the irreversible capacity decreased by removing the particles having a diameter of less than 1 µm.

TABLE 1

| | | Demineralization | | Final heat-treatment Temp. C. | Particle diameter | | H/C | K content % | Fe content % | Specific surface area m$^2$/g |
| | Material | Gas | Temperature | | Dv$_{90}$ µm | <1 µm or less % | | | | |
|---|---|---|---|---|---|---|---|---|---|---|
| Referential Example 1 | Palm shell | Gas-phase | Hydrogen chloride | 950 | 1200 | 7 | 0.0 | 0.02 | 0.004 | 0.002 | 22 |
| Referential Example 2 | Palm shell | Liquid-phase | Hydrochloric acid | 100 | 1200 | 19 | 0.0 | 0.02 | 0.049 | 0.059 | 5.4 |
| Referential Example 3 | Palm shell | Gas-phase | Hydrogen chloride | 950 | 1200 | 7 | 2.5 | 0.02 | 0.004 | 0.005 | 25 |
| Referential Example 4 | Palm shell | Gas-phase | Hydrogen chloride | 950 | 1200 | 7 | 4.2 | 0.02 | 0.005 | 0.007 | 30 |

TABLE 2

| | Battery performance | | |
|---|---|---|---|
| | Discharge capacity mAh/g | Irreversible capacity mAh/g | Output performance % |
| Referential Example 1 | 419 | 98 | 65 |
| Referential Example 3 | 418 | 104 | 60 |
| Referential Example 4 | 417 | 116 | — |

Example 1

(1) Production of Carbon Precursor A 680 g of a petroleum-based pitch having a softening point of 200° C. to 210° C. and 320 g of naphthalene were subjected to heating, melting and mixing at 190° C. in a pressure-resistant vessel. Thereafter, the resultant was cooled and extruded, and thus a pellet-like molded body having a diameter of 500 µm was obtained. This molded body was crushed, and the crushed product thus obtained was dispersed through stirring in an aqueous solution which was prepared by dissolving 0.3% by weight of a polyvinyl alcohol (degree of saponification 88%) and was heated to 92° C. The dispersion was cooled, and a slurry of a spherical pitch molded body was obtained. Water of the supernatant was removed by filtration, and naphthalene in the pitch molded body was removed by extraction with n-hexane in an amount three times the weight of the spherical pitch molded body. The porous spherical pitch thus obtained was heated to 260° C. in a heated air atmosphere, and was maintained at 260° C. for 1 hour to oxidize the pitch. Thus, a porous spherical oxidized pitch (indicated as an oxidized pitch) that was infusible to heat, that is, a carbon precursor A, was obtained. The percentage content of elemental oxygen in this carbon precursor A was determined by an elemental analysis, and the percentage content was found to be 17% by weight. The carbon precursor A is a non-graphitizable carbon precursor.

(2) Production of Carbonaceous Material

To 100 g of a palm shell char having a particle diameter of 2.360 to 0.850 mm (including 98% by weight of particles having a particle diameter of 2.360 to 0.850 mm), which was obtained by crushing and carbonizing palm shells at 500° C., a nitrogen gas including 1% by volume of hydrogen chloride gas was supplied at a flow rate of 10 L/min, and thereby the palm shell char was treated for 80 minutes at 950° C. Subsequently, only the supply of the hydrogen chloride gas was stopped, and the palm shell char was further heat treated for 30 minutes at 950° C. Thus, a heat-treated palm shell carbon was obtained. The heat-treated palm shell carbon thus obtained was pulverized with a jet mill and classified into particles having an average particle diameter of 10 μm, and thus a palm shell char carbon precursor was obtained. The carbon precursor A and the palm shell char carbon precursor thus obtained were mixed at a ratio of 10:90, and then the mixture was pulverized with a rod mill. Thus, a powdered carbon precursor mixture having an average particle diameter of approximately 12 μm was obtained. 10 g of the powdered carbon precursor mixture was introduced into a horizontal type tubular furnace having a diameter of 100 mm, the temperature of the mixture was raised to 1250° C. at a rate of 250° C./h while nitrogen gas was streamed into the furnace at a rate of 10 liters per minute, and the mixture was carbonized by maintaining at 1250° C. for 1 hour. Thus, a carbonaceous material 1 was obtained.

Example 2

The procedure described in Example 1 was repeated, except that the mixture ratio of the carbon precursor A and the palm shell char carbon precursor was 30:70, to obtain the carbonaceous material 2.

Example 3

The procedure described in Example 1 was repeated, except that the mixture ratio of the carbon precursor A and the palm shell char carbon precursor was 50:50, to obtain the carbonaceous material 3.

Comparative Example 1

The palm shell char carbon precursor obtained in the section "(2) Production of carbonaceous material" of Example 1 was pulverized with a rod mill, and thus a powdered carbon precursor having an average particle diameter of approximately 12 μm was obtained. 10 g of the powdered carbon precursor was introduced into a horizontal type tubular furnace having a diameter of 100 mm, the temperature of the carbon precursor was raised to an internal temperature of 1250° C. at a rate of 250° C./h while nitrogen gas was streamed into the furnace at a rate of 10 liters per minute, and the carbon precursor was maintained at 1250° C. for 1 hour. Thus, a comparative carbonaceous material 1 was obtained.

Comparative Example 2

The procedure described in the item "(2) production of carbonaceous material" of Example 1 was repeated, except that the mixture ratio of the carbon precursor A and the palm shell char carbon precursor was 5:95, to obtain the comparative carbonaceous material 2.

Comparative Example 3

The procedure described in the item "(2) production of carbonaceous material" of Example 1 was repeated, except that the mixture ratio of the carbon precursor A and the palm shell char carbon precursor was 70:30, to obtain the comparative carbonaceous material 3.

Comparative Example 4

The carbon precursor A produced in the section "(1) Production of carbon precursor A" of Example 1 was preliminarily heat-treated at 650° C. and carbonized, and then the carbon precursor A was pulverized with a rod mill. Thus, a powdered carbon precursor having an average particle diameter of approximately 12 μm was obtained. 10 g of the powdered carbon precursor mixture was introduced into a horizontal type tubular furnace having a diameter of 100 mm, the temperature of the mixture was raised to 1250° C. at a rate of 250° C./h while nitrogen gas was streamed into the furnace at a rate of 10 liters per minute, and the mixture was maintained at 1250° C. for 1 hour. Thus, a comparative carbonaceous material 4 was obtained.

Example 4

(1) Production of Graphitizable Carbon Precursor 680 g of a petroleum-based pitch having a softening point of 200° C. to 210° C. and 320 g of naphthalene were subjected to heating, melting and mixing at an internal temperature of 190° C. in a pressure-resistant vessel. Thereafter, the mixture was cooled and extruded, and thus a pellet-like molded body having a diameter of 500 μm was obtained. This molded body was crushed, and the crushed product thus obtained was dispersed with stirring in an aqueous solution which was obtained by dissolving 0.3% by weight of a polyvinyl alcohol (degree of saponification 88%) and was heated to an internal temperature of 92° C. The dispersion was cooled, and a slurry of a spherical pitch molded body was obtained. Water of the supernatant was removed by filtration, and naphthalene in the pitch molded body was removed by extraction with n-hexane in an amount three times the weight of the spherical pitch molded body. Thus, a porous spherical pitch (carbon precursor) was obtained. The porous spherical pitch thus obtained was heated to 157° C. using a fluidized bed while heated air was passed in, and the porous spherical pitch was maintained at 157° C. for 1 hour to oxidize the pitch. Thus, a porous spherical oxidized pitch was obtained. The percentage content of oxygen in this oxidized pitch was 3%. This oxidized pitch was heat treated for 1 hour at 420° C. in a nitrogen atmosphere, and was then pulverized. Thus, a pitch-based carbon precursor B having an average particle diameter of about 10 μm was obtained.

(2) Production of Carbonaceous Material

To 100 g of a palm shell char having a particle diameter of 2.360 to 0.850 mm (including 98% by weight of particles having a particle diameter of 2.360 to 0.850 mm), which was obtained by crushing and carbonizing palm shells at 500° C., a nitrogen gas including 1% by volume of hydrogen chloride gas was supplied at a flow rate of 10 L/min, and thereby the palm shell char was treated for 80 minutes at 950° C. Subsequently, only the supply of the hydrogen chloride gas was stopped, and the palm shell char was further heat treated for 30 minutes at 950° C. Thus, a heat-treated palm shell carbon was obtained. The heat-treated palm shell carbon thus obtained was pulverized with a jet mill and classified into particles having an average particle diameter of 10 μm, and thus a palm shell char carbon precursor was obtained. Thereafter, the pitch-based carbon precursor and the palm shell char carbon precursor were mixed at a ratio of 5:95, and 10 g of the powdered carbon precursor mixture thus mixed was introduced into a horizontal type tubular furnace having a diameter of 100 mm. The temperature of the mixture was raised to 1200° C. at a rate of 250° C./h while nitrogen gas was streamed into the furnace at a rate of 10 liters per minute, and the mixture was carbonized by maintaining at 1200° C. for 1 hour. Thus, a carbonaceous material 4 was obtained.

Example 5

The procedure described in the item "(2) production of carbonaceous material" of Example 4 was repeated, except that the mixture ratio of the pitch-based carbon precursor B and the palm shell char carbon precursor was 10:90, to obtain the carbonaceous material 5.

Example 6

The procedure described in the item "(2) production of carbonaceous material" of Example 4 was repeated, except that the mixture ratio of the pitch-based carbon precursor B and the palm shell char carbon precursor was 20:80, to obtain the carbonaceous material 6.

Example 7

The procedure described in the item "(2) production of carbonaceous material" of Example 4 was repeated, except that the mixture ratio of the pitch-based carbon precursor B and the palm shell char carbon precursor was 30:70, to obtain the carbonaceous material 7.

Example 8

The procedure described in the item "(2) production of carbonaceous material" of Example 4 was repeated, except that the mixture ratio of the pitch-based carbon precursor B and the palm shell char carbon precursor was 50:50, to obtain the carbonaceous material 8.

Example 9

The procedure described in the item "(2) production of carbonaceous material" of Example 4 was repeated, except that the mixture ratio of the pitch-based carbon precursor B and the palm shell char carbon precursor was 10:90 and the temperature of final heat-treatment was 1250° C., to obtain the carbonaceous material 9.

Example 10

The procedure described in Example 9 was repeated, with the exception of using the polyvinyl chloride (TAIYO PVC TH-800; TAIYO VINYL CORPORATION) instead of the pitch-based carbon precursor B, to obtain the carbonaceous material 10.

Comparative Example 5

The heat-treated palm shell carbon obtained in the section "(2) Production of carbonaceous material" of Example 4 was pulverized with a jet mill, and a palm shell char carbon precursor having an average particle diameter of approximately 10 μm was obtained. 10 g of the palm shell char carbon precursor was introduced into a horizontal type tubular furnace having a diameter of 100 mm, the temperature of the carbon precursor was raised to 1200° C. at a rate of 250° C./h while nitrogen gas was streamed into the furnace at a rate of 10 liters per minute, and the mixture was maintained at 1200° C. for 1 hour. Thus, a comparative carbonaceous material 5 was obtained.

Comparative Example 6

The procedure described in the item "(2) production of carbonaceous material" of Example 4 was repeated, except that the mixture ratio of the pitch-based carbon precursor and the palm shell char carbon precursor was 2:98, to obtain the comparative carbonaceous material 6.

Comparative Example 7

The procedure described in the item "(2) production of carbonaceous material" of Example 4 was repeated, except that the mixture ratio of the pitch-based carbon precursor and the palm shell char carbon precursor was 70:30, to obtain the comparative carbonaceous material 7.

Comparative Example 8

The porous spherical oxidized pitch produced in the section "(1) Production of carbon precursor" of Example 4 was preliminarily heat-treated at 650° C. and carbonized, and then the oxidized pitch was pulverized with a ball mill. Thus, the spherical oxidized pitch was adjusted to particles having an average particle diameter of approximately 10 μm. 10 g of the particles thus obtained were introduced into a horizontal type tubular furnace having a diameter of 100 mm, the temperature of the particles was raised to 1200° C. at a rate of 250° C./h while nitrogen gas was streamed into the furnace at a rate of 10 liters per minute, and the particles were maintained at 1200° C. for 1 hour. Thus, a comparative carbonaceous material 8 was obtained.

Comparative Example 9

The pitch carbon precursor produced in the same manner as in Example 4 was carbonized at 650° C., and then the pitch carbon precursor was mixed with a palm shell char carbon precursor at a ratio of 5:95. Similarly to Example 1, 10 g of the powdered carbon precursor mixture thus mixed was introduced into a horizontal type tubular furnace having a diameter of 100 mm, the temperature of the mixture was raised to 1200° C. at a rate of 250° C./h while nitrogen gas was streamed into the furnace at a rate of 10 liters per minute, and the mixture was carbonized by maintaining at 1200° C. for 1 hour. Thus, a comparative carbonaceous material 9 was obtained.

Example 11

The operation of "(2) Production of carbonaceous material" of Example 1 was repeated, except that the carbon precursor A was changed to a carbon precursor C that was a mixture of the carbon precursor A and the pitch-based carbon precursor B (mixing ratio 50:50), and the mixing ratio of the carbon precursor C and the palm shell char carbon precursor was set to 30:70. Thus, a carbonaceous material 11 was obtained.

<<Method for Producing Measurement Cell>>

Non-aqueous electrolyte secondary batteries were produced as follows, using the negative electrode materials produced in the various Examples and Comparative Examples described above (carbonaceous materials 1 to 11 and comparative carbonaceous materials 1 to 9), and characteristics of the batteries were evaluated. The negative electrode material of the present invention is suitable for the negative electrode of a non-aqueous electrolyte secondary battery; however, in order to accurately evaluate the discharge capacity and the irreversible capacity of a battery active material without being affected by fluctuations of the counter electrode performance, lithium secondary batteries were configured using the electrodes obtained as described above and using lithium metal having stabilized characteristics as a counter electrode, and the characteristics of the secondary batteries were evaluated.

A positive electrode (carbon electrode) was produced as follows. N-methyl-2-pyrrolidone was added to 94 parts by weight of the negative electrode material (carbonaceous material) produced in each Example and 6 parts by weight of polyvinylidene fluoride to obtain a paste form, and the paste was uniformly applied on a copper foil and dried. Subsequently, a sheet-like electrode was punched into a disc shape having a diameter of 15 mm, this was pressed, and the resultant was used as an electrode. The weight of the carbonaceous material (negative electrode material) in the electrode was adjusted to be 10 mg, and the electrode was pressed such that the filling ratio of the carbon material (density of the carbonaceous material in the electrode/true density according to the butanol method) would be about 61%. Incidentally, in Examples 4 to 10 (carbonaceous materials 4 to 10) and Comparative Examples 5 to 9 (comparative carbonaceous materials 5 to 9), the electrodes were pressed such that the filling ratio of the carbon material would be about 67%.

Production of a negative electrode (lithium electrode) was carried out inside a glove box in an Ar gas atmosphere. A stainless steel net disc having a diameter of 16 mm was spot-welded in advance to the outer lid of a 2016-sized coin type battery can, and then a lithium metal sheet having a thickness of 0.8 mm and punched into a disc shape having a diameter of 15 mm was compressed onto the stainless steel net disc. Thus, an electrode was obtained. A 2016-sized coin type non-aqueous electrolyte lithium secondary battery was assembled in a glove box in an Ar atmosphere, using the positive electrode and the negative electrode produced as such, using a product obtained by adding $LiClO_4$ at a proportion of 1.0 mol/L to a mixed solvent obtained by mixing propylene carbonate and dimethoxyethane at a volume ratio of 1:1 as the liquid electrolyte, and using a polypropylene separator having a diameter of 19 mm and a gasket made of polyethylene.

<<Measurement of Battery Capacity>>

For a lithium secondary battery having the configuration described above, a charge-discharge test was carried out using a charge-discharge testing apparatus ("TOSCAT" manufactured by Toyo System Co., Ltd.), and charging and discharging was carried out by a constant current constant voltage method. Here, "charging" is a discharging reaction in a test battery; however, since this case is a reaction of lithium insertion into a carbon material, this is described as "charging" for convenience. On the contrary, "discharging" is a charging reaction in a test battery; however, since this case is a reaction of lithium desorption from a carbon material, this is described as "discharging" for convenience. Here, the constant current constant voltage method employed is carried out by performing charging at a constant current density of 0.5 $mA/cm^2$ until the battery voltage reaches 0 V, subsequently varying the current value continuously so as to maintain the voltage at 0 V (while maintaining a constant voltage), and continuing charging until the current value reaches 20 μA. The value obtained by dividing the amount of electricity supplied at this time by the weight of the carbon material of the electrode was defined as the charge capacity (doping capacity) per unit weight of the carbon material (mAh/g). After completion of charging, the battery circuit was opened for 30 minutes, and thereafter, discharging was performed. Discharging was performed at a constant current density of 0.5 $mA/cm^2$ until the battery voltage reached 1.5 V, and the value obtained by dividing the amount of electricity discharged at this time by the weight of the carbon material of the electrode was defined as the discharge capacity (dedoping capacity) per unit weight of the carbon material (mAh/g). The irreversible capacity (non-dedoping capacity) (mAh/g) is calculated by the formula: charge amount−discharge amount, and the efficiency (%) is calculated by the formula: (discharge capacity/charge capacity)×100.

Measurement values of n=3 for a test battery produced using the same sample were averaged, and thereby, the charge and discharge capacities and the irreversible capacity were determined.

The physical properties of the carbonaceous materials 1 to 11 and the comparative carbonaceous materials 1 to 9, and performance of the lithium-ion secondary batteries produced using those carbonaceous materials are presented in Table 3 to Table 7.

Figure 2:
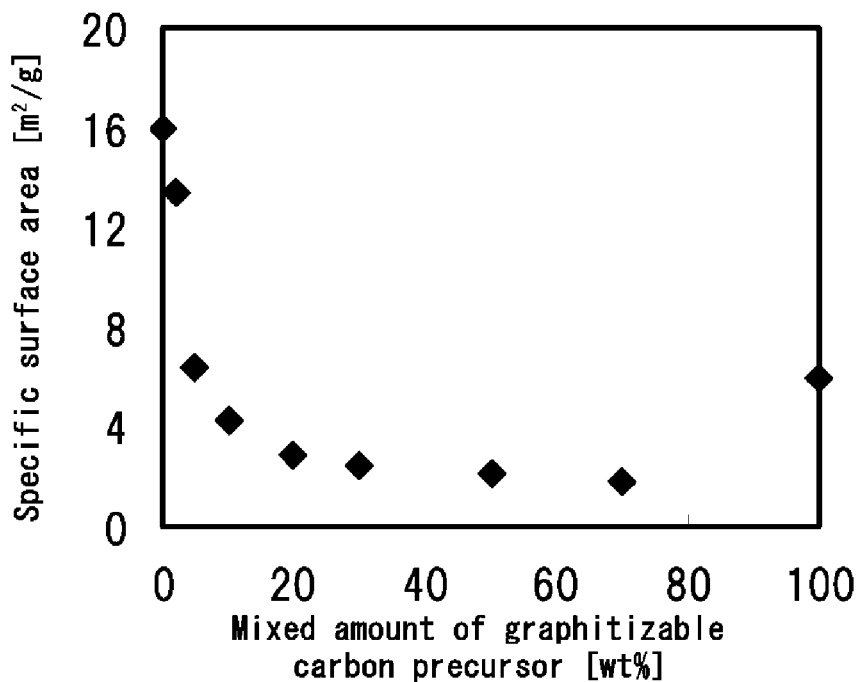
FIG. 2 is a graph showing the changes of specific surface area of the carbonaceous materials (Examples 4 to 8, and Comparative Examples 5 to 8) according to mixed amounts of graphitizable carbon precursor.
Figure 3:
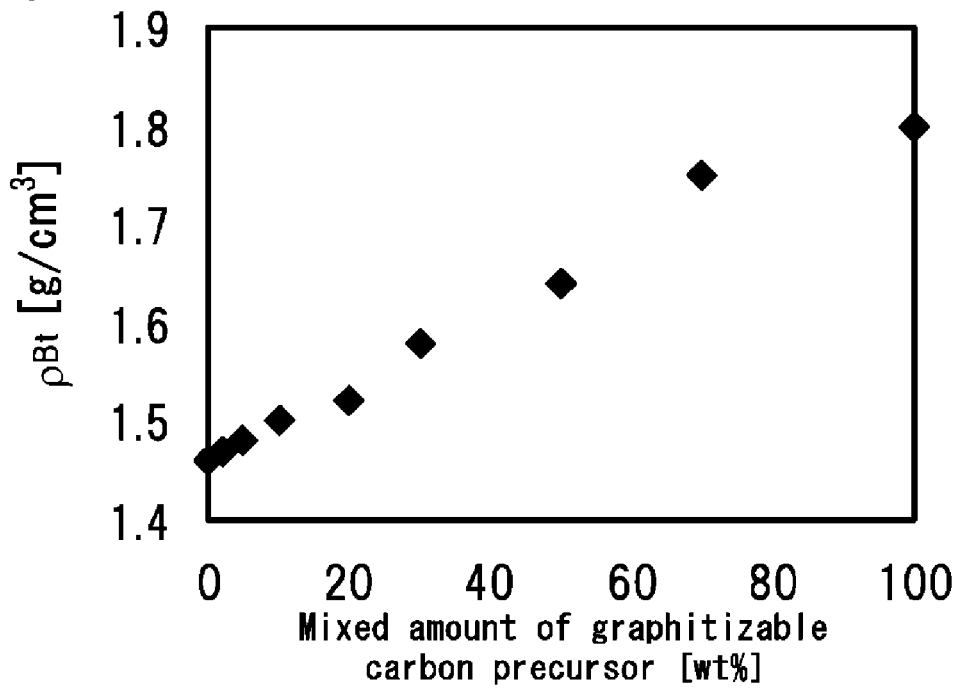
FIG. 3 is a graph showing the changes of $\rho_{Bt}$ of the carbonaceous materials (Examples 4 to 8, and Comparative Examples 5 to 8) according to mixed amounts of graphitizable carbon precursor.
Figure 4:
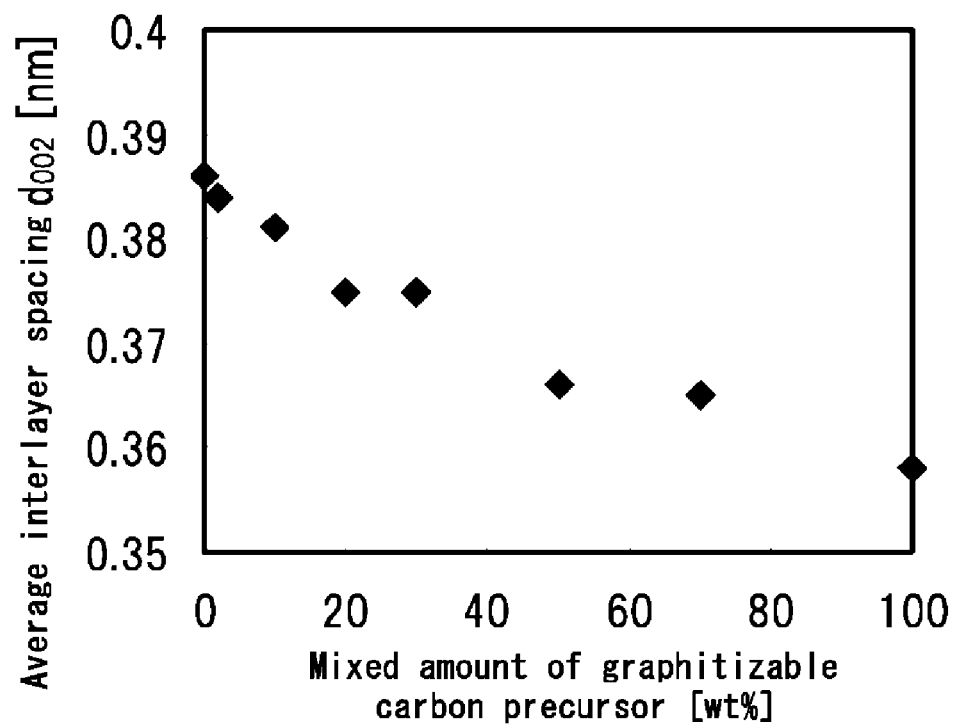
FIG. 4 is a graph showing the changes of $d_{002}$ of the carbonaceous materials (Examples 4 to 8, and Comparative Examples 5 to 8) according to mixed amounts of graphitizable carbon precursor.

Furthermore, changes in the specific surface areas of the carbonaceous materials (Examples 1 to 3 and Comparative Examples 1 and 3) caused by the amount of incorporation of the carbon precursor A are presented in FIG. 1, and changes in the specific surface areas of the carbonaceous materials (Examples 4 to 8 and Comparative Examples 5 to 8) caused by the amount of incorporation of the pitch-based carbon precursor B are presented in FIG. 2.

TABLE 3

| | Material | Mixture | Mixed amount wt % | Heat-treatment Temp. C. | Average particle diameter μm | SSA $m^2/g$ | Interlayer spacing nm | Lc A | $\rho_{Bt}$ $g/cm^2$ |
|---|---|---|---|---|---|---|---|---|---|
| Example 1 | Palm shell char | Carbon precursor A | 10 | 1250 | 13.4 | 8.0 | 0.384 | 1.2 | 1.46 |
| Example 2 | Palm shell char | Carbon precursor A | 30 | 1250 | 13.2 | 4.7 | 0.382 | 1.2 | 1.46 |
| Example 3 | Palm shell char | Carbon precursor A | 50 | 1250 | 14.0 | 4.8 | 0.382 | 1.2 | 1.49 |
| Comparative Example 1 | Palm shell char | None | 0 | 1250 | 13.3 | 18.9 | 0.383 | 1.2 | 1.45 |

TABLE 3-continued

| | Material | Mixture | Mixed amount wt % | Heat-treatment Temp. C. | Average particle diameter μm | SSA m²/g | Interlayer spacing nm | Lc A | $\rho_{Bt}$ g/cm² |
|---|---|---|---|---|---|---|---|---|---|
| Comparative Example 3 | Palm shell char | Carbon precursor A | 5 | 1250 | 12.7 | 10.6 | 0.384 | 1.1 | 1.45 |
| Comparative Example 4 | Palm shell char | Carbon precursor A | 70 | 1250 | 13.5 | 3.2 | 0.382 | 11.0 | 1.50 |
| Referential Example 3 | Carbon precursor A | — | 100 | 1200 | 11.5 | 4.6 | 0.384 | 1.1 | 1.52 |

TABLE 4

| | Material | Mixture | Mixed amount wt % | Charge capacity mAh/g | Discharge capacity mAh/g | Irreversible capacity mAh/g | Efficiency % |
|---|---|---|---|---|---|---|---|
| Example 1 | Palm shell char | Carbon precursor A | 10 | 454 | 383 | 71 | 84.3 |
| Example 2 | Palm shell char | Carbon precursor A | 30 | 468 | 403 | 65 | 86.2 |
| Example 3 | Palm shell char | Carbon precursor A | 50 | 469 | 402 | 67 | 85.7 |
| Comparative Example 1 | Palm shell char | None | 0 | 437 | 365 | 73 | 83.4 |
| Comparative Example 3 | Palm shell char | Carbon precursor A | 5 | 438 | 368 | 70 | 84.0 |
| Comparative Example 4 | Palm shell char | Carbon precursor A | 70 | 446 | 392 | 54 | 87.9 |

In a comparison between the fundamental physical properties of the carbonaceous materials obtained in Examples 1 to 3 of the present invention and the fundamental physical properties of the carbonaceous materials obtained in Comparative Example 1, the specific surface area was decreased with an increase in the amount of the carbon precursor A, and a coating film produced from the gas generated from the carbon precursor A exhibited an excellent effect of reducing the specific surface area (Table 3 and FIG. 1). Furthermore, in a comparison between the electrical characteristics of Examples 1 to 3 and the electrical characteristics of Comparative Example 1, a decrease in the non-dedoping capacity was promoted as the amount of the carbon precursor A was increased, and the dedoping capacity increased, while the efficiency was also increased (Table 4).

However, in Comparative Example 3, since the amount of incorporation of the carbon precursor A is as small as 5% by weight, the decrease in the specific surface area is low, and the effect of improving the battery characteristics is also low. On the other hand, in Comparative Example 4, the amount of incorporation of the carbon precursor A is large, and the carbon precursor A acts as a base material. For that reason, further incorporation thereof causes a decrease in the content of plant-derived char that has been demineralized in a gas-phase, and the dedoping capacity is decreased, which is not preferable.

TABLE 5

| | | Heat-treatment Temp. [C.] | Mixed amount of precursor [wt %] | Charge capacity [mAh/g] | Discharge capacity [mAh/g] | Irreversible capacity [mAh/g] | Efficiency [%] | $Dv_{90}$ [μm] | SSA [m²/g] | $d_{002}$ [nm] | Lc [nm] | $\rho_{Bt}$ [g/cm³] | H/C [—] |
|---|---|---|---|---|---|---|---|---|---|---|---|---|---|
| Example 4 | Pitch-based precursor B | 1200 | 5 | 476 | 402 | 74 | 84.5 | 10.8 | 6.4 | 0.383 | 1.1 | 1.48 | 0.02 |
| Example 5 | Pitch-based precursor B | 1200 | 10 | 474 | 403 | 71 | 85.1 | 14.1 | 4.3 | 0.381 | 1.1 | 1.50 | 0.02 |
| Example 6 | Pitch-based precursor B | 1200 | 20 | 468 | 402 | 67 | 85.8 | 11.2 | 2.9 | 0.375 | 1.2 | 1.52 | 0.02 |
| Example 7 | Pitch-based precursor B | 1200 | 30 | 463 | 398 | 64 | 86.1 | 11.1 | 2.5 | 0.375 | 1.2 | 1.58 | 0.02 |
| Example 8 | Pitch-based precursor B | 1200 | 50 | 416 | 362 | 53 | 87.1 | 11.9 | 2.1 | 0.366 | 1.5 | 1.64 | 0.02 |
| Example 9 | Pitch-based precursor B | 1250 | 10 | 443 | 383 | 61 | 86.3 | 12.5 | 4.2 | 0.381 | 1.1 | 1.50 | 0.02 |
| Example 10 | Polyvinyl chloride | 1200 | 10 | 458 | 390 | 68 | 85.2 | 12.4 | 2.9 | 0.385 | 1.0 | 1.46 | 0.02 |
| Comparative Example 5 | Pitch-based precursor B | 1200 | 0 | 486 | 396 | 90 | 81.4 | 10.8 | 16.0 | 0.386 | 1.0 | 1.46 | 0.02 |

TABLE 5-continued

|  |  | Heat-treatment Temp. [C.] | Mixed amount of precursor [wt %] | Charge capacity [mAh/g] | Discharge capacity [mAh/g] | Irreversible capacity [mAh/g] | Efficiency [%] | $Dv_{90}$ [μm] | SSA [m²/g] | $d_{002}$ [nm] | Lc [nm] | $\rho_{Bt}$ [g/cm³] | H/C [—] |
|---|---|---|---|---|---|---|---|---|---|---|---|---|---|
| Comparative Example 6 | Pitch-based precursor B | 1200 | 2 | 485 | 398 | 87 | 82.1 | 13.1 | 13.4 | 0.384 | 1.0 | 1.47 | 0.02 |
| Comparative Example 7 | Pitch-based precursor B | 1200 | 70 | 383 | 331 | 52 | 86.4 | 11.7 | 1.8 | 0.365 | 1.6 | 1.75 | 0.02 |
| Comparative Example 8 | Pitch-based precursor B | 1200 | 100 | 314 | 285 | 28 | 90.9 | 8.8 | 5.9 | 0.358 | 1.6 | 1.80 | 0.02 |
| Comparative Example 9 | Pitch-based precursor B | 1200 | 5 | 480 | 397 | 83 | 82.8 | 11.7 | 18.2 | 0.383 | 1.1 | 1.48 | 0.02 |

In a comparison of the fundamental properties of the carbonaceous materials obtained in Examples 4 to 8 of the present invention and the fundamental properties of the carbonaceous materials obtained in Comparative Example 5, the specific surface area is decreased with an increase in the amount of incorporation of the carbon precursor, and the carbonaceous coating film produced by a gas generated from the carbon precursor exhibits an excellent effect (Table 5 and FIG. 2). Furthermore, in a comparison between the electrical characteristics of Examples 4 and 5 and the electrical characteristics of Comparative Example 5, a decrease in the non-dedoping capacity (irreversible capacity) was promoted as the amount of incorporation of the carbon precursor was increased, and the efficiency was increased (Table 5).

However, in Comparative Example 6, since the amount of incorporation of the carbon precursor is as small as 2% by weight, the decrease in the specific surface area was low, and the effect of improving the battery characteristics was also low. On the other hand, in Comparative Example 7, the amount of incorporation of the carbon precursor is large, and the carbon precursor acts as a base material. For that reason, further incorporation tends to cause a decrease in the doping capacity or the dedoping capacity, which is not preferable.

In regard to the specific surface areas of the carbonaceous materials thus obtained, a decrease in the specific surface area that exceeds additivity is recognized, as a result of coating the surface of the carbon material by the tar component generated from a graphitizable carbon precursor. On the other hand, since the tar component is not involved in the plane spacing $d_{002}$ or $\rho_{Bt}$, it is speculated that additivity is composed of plant-derived char and a graphitizable carbon precursor.

It was understood from Table 6 and Table 7 that a decrease in the specific surface area is manifested by a mixture of a non-graphitizable carbon precursor and a graphitizable carbon precursor, and the effects of the present invention are obtained.

Example 12

(1) Pulverization of Organic Compound A (Polystyrene)

Polystyrene (GPPS HF77 manufactured by PS Japan Corp.) was frozen using liquid nitrogen and was pulverized with a rod mill. Thus, a powdered organic compound A having an average particle diameter of approximately 500 μm was obtained.

(2) Production of Carbonaceous Material

To 100 g of a palm shell char having a particle diameter of 2.360 to 0.850 mm (including 98% by weight of particles having a particle diameter of 2.360 to 0.850 mm), which was obtained by crushing and carbonizing palm shells at 500° C., a nitrogen gas including 1% by volume of hydrogen chloride gas was supplied at a flow rate of 10 L/min, and thereby the palm shell char was treated for 80 minutes at 950° C. Subsequently, only the supply of the hydrogen chloride gas was stopped, and the palm shell char was further heat treated for 30 minutes at 950° C. Thus, a heat-treated palm shell carbon was obtained. The heat-treated palm shell carbon thus obtained was pulverized with a jet mill and classified to an average particle diameter of 10 μm, and thus a palm shell char carbon precursor was obtained. The palm shell char carbon precursor was pulverized with a MultiNo jet mill, and thus a powdered palm shell char carbon precursor

TABLE 6

|  | Material | Mixture | Mixed amount wt % | Heat-treatment Temp. C. | Average particle diameter μm | SSA m²/g | Interlayer spacing nm | Lc A | $\rho_{Bt}$ g/cm³ |
|---|---|---|---|---|---|---|---|---|---|
| Example 11 | Palm shell char | Carbon precursor A/Carbon precursor B = 50/50 | 30 | 1250 | 13.3 | 2.8 | 0.379 | 12 | 1.51 |

TABLE 7

|  | Material | Mixture | Mixed amount wt % | Charge capacity mAh/g | Discharge capacity mAh/g | Irreversible capacity mAh/g | Efficiency % |
|---|---|---|---|---|---|---|---|
| Example 11 | Palm shell char | Carbon precursor A/Carbon precursor B = 50/50 | 30 | 437 | 382 | 55 | 87.4 | having an average particle diameter of approximately 10 µm was obtained. The powdered palm shell char and the powdered organic compound A were mixed at a ratio of 90:10, and 10 g of the mixture was introduced into a horizontal type tubular furnace having a diameter of 100 mm. The temperature of the mixture was raised to 1250° C. at a rate of 250° C./h while nitrogen gas was streamed into the furnace at a rate of 10 liters per minute, the mixture was carbonized by maintaining at 1250° C. for 1 hour, and thus a carbonaceous material 12 was obtained.

Example 13

The procedure described in Example 12 was repeated, except that the mixture ratio of the palm shell char carbon precursor and the organic compound A was 70:30, to obtain the carbonaceous material 13.

Example 14

The procedure described in Example 12 was repeated, except that the mixture ratio of the palm shell char carbon precursor and the organic compound A was 50:50, to obtain the carbonaceous material 14.

Example 15

(1) Pulverization of Organic Compound B (Polyethylene)
Polyethylene (Mitsui Chemicals: HI-ZEX MILLION 240S) was freezed using a liquid nitrogen and pulverized through a rod mill to obtain the powdery organic compound B having an average particle diameter of about 500 µm.
(2) Preparation of Carbonaceous Material
The procedure described in Example 12(2) was repeated, with the exception of using the organic compound B instead of the organic compound A, to obtain the carbonaceous material 15.

Example 16

(1) Preparation of Carbonaceous Material
The procedure described in Example 12(2) was repeated, with the exception of using the organic compound C (METOLOSE:Shin-Etsu Chemical Co., Ltd.: 60SH-15) instead of the organic compound A, to obtain the carbonaceous material 16.

Example 17

(1) Preparation of Carbonaceous Material
The procedure described in Example 12(2) was repeated, with the exception of using the organic compound D (phenanthrene:KANTO CHEMICAL CO., INC; Lot No.007D2089) instead of the organic compound A, to obtain the carbonaceous material 17.

Example 18

(1) Preparation of Carbonaceous Material
The procedure described in Example 12(2) was repeated, with the exception of using the organic compound D (anthracene:TOKYO CHEMICAL INDUSTRY CO., LTD; Lot-.FJN01) instead of the organic compound A, to obtain the carbonaceous material 18.

Comparative Example 10

The heat-treated palm shell carbon was pulverized with a rod mill, and thus a palm shell char carbon precursor having an average particle diameter of approximately 12 µm was obtained. 10 g of the palm shell char carbon precursor was introduced into a horizontal type tubular furnace having a diameter of 100 mm, the temperature of the carbon precursor was increased to an internal temperature of 1250° C. at a rate of 250° C./h while nitrogen gas was streamed into the furnace at a rate of 10 liters per minute, and the carbon precursor was maintained at 1250° C. for 1 hour. Thus, a comparative carbonaceous material 10 was obtained.

Non-aqueous electrolyte secondary batteries were produced using the negative electrode materials produced in Examples 12 to 18 and Comparative Example 10 (carbonaceous materials 12 to 18 and comparative carbonaceous materials 10), according to the method for producing a measurement cell and the measurement of the battery capacity as described above, and the characteristics of the batteries were evaluated.

The physical properties of the carbonaceous materials 12 to 14 and the comparative carbonaceous material 10, and the performance of the lithium-ion secondary batteries produced using those carbonaceous materials are presented in Table 8.

Figure 5:
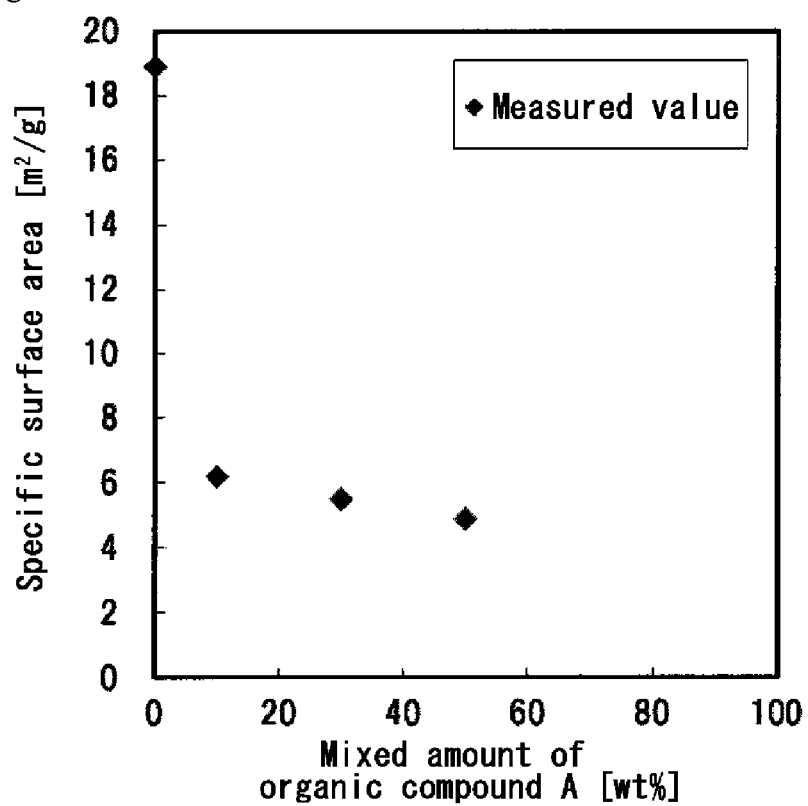
FIG. 5 is a graph showing the changes of specific surface area of the carbonaceous materials (Examples 12 to 14, and Comparative Example 10) according to mixed amounts of organic compound A.

Furthermore, changes in the specific surface areas of the carbonaceous materials (Examples 1 to 3 and Comparative Example 1) caused by the amount of incorporation of the organic compound A are presented in FIG. 5.

The physical properties of the carbonaceous materials 15 to 18 and the comparative carbonaceous material 1, and the performance of the lithium-ion secondary batteries produced using those carbonaceous materials are presented in Table 9.

TABLE 8

| | Mixture | Actual carbon ratio of mixture % | Mixed amount wt % | Heat treatment Temp. C. | Average particle diameter µm | SSA $m^2/g$ | Interlayer spacing nm | Lc nm | $\rho_{Bt}$ $g/cm^3$ | Charge capacity mAh/g | Discharge capacity mAh/g | Irreversible capacity mAh/g | Efficiency % |
|---|---|---|---|---|---|---|---|---|---|---|---|---|---|
| Example 12 | Organic compound A | 0 | 10 | 1250 | 11.4 | 6.2 | 0.383 | 1.2 | 1.46 | 456 | 395 | 60 | 86.8 |
| Example 13 | Organic compound A | 0 | 30 | 1250 | 11.6 | 5.5 | 0.383 | 1.2 | 1.46 | 464 | 409 | 55 | 88.1 |
| Example 14 | Organic compound A | 0 | 50 | 1250 | 12.5 | 4.9 | 0.382 | 1.2 | 1.46 | 470 | 418 | 52 | 88.9 |
| Comparative Example 10 | Organic compound A | — | 0 | 1250 | 13.3 | 18.9 | 0.383 | 1.2 | 1.45 | 437 | 365 | 73 | 83.4 |

TABLE 9

| | Mixture | Actual carbon ratio of mixture % | Mixed amount wt % | Heat-treatment Temp. C. | Average particle diameter μm | SSA m²/g | Inter-layer spacing nm | Lc nm | $\rho_{Bt}$ g/cm³ | Charge capacity mAh/g | Discharge capacity mAh/g | Irreversible capacity mAh/g | Efficiency % |
|---|---|---|---|---|---|---|---|---|---|---|---|---|---|
| Example 15 | Organic compound B | 0 | 10 | 1250 | 12.6 | 7.6 | 0.383 | 1.2 | 1.46 | 445 | 379 | 67 | 85.1 |
| Example 16 | Organic compound C | 0 | 10 | 1250 | 12.9 | 5.3 | 0.386 | 1.1 | 1.45 | 456 | 386 | 70 | 84.7 |
| Example 17 | Organic compound D | 0 | 30 | 1250 | 11.7 | 2.7 | 0.386 | 1.1 | 1.46 | 484 | 412 | 72 | 85.0 |
| Example 18 | Organic compound E | 0 | 30 | 1250 | 11.7 | 5.5 | 0.386 | 1.1 | 1.46 | 468 | 408 | 60 | 87.2 |
| Comparative Example 10 | Organic compound A | — | 0 | 1250 | 13.3 | 18.9 | 0.383 | 1.2 | 1.45 | 437 | 365 | 73 | 83.4 |

In a comparison between the fundamental properties of the carbonaceous materials obtained in Examples 12 to 14 of the present invention and the fundamental properties of the carbonaceous materials obtained in Comparative Example 10, the specific surface area was decreased with an increase in the organic compound A, and the coating film produced by a gas generated by the organic compound A exhibits an excellent effect of decreasing the specific surface area (Table 8 and FIG. 5). Furthermore, in a comparison between the electrical characteristics of Examples 12 to 14 and the electrical characteristics of Comparative Example 10, a decrease in the non-dedoping capacity was promoted as the amount of the organic compound A increased, and the dedoping capacity increased, while the efficiency was also increased (Table 8).

In a comparison between the fundamental properties of the carbonaceous materials obtained in Examples 15 to 18 of the present invention and the fundamental properties of the carbonaceous materials obtained in Comparative Example 10, the specific surface area was decreased as a result of the heat-treatment of mixtures with the organic compounds B to E, and the coating films produced by gases generated from the organic compounds B to E exhibited an excellent effect (Table 9). Furthermore, in a comparison between the electrical characteristics of Examples 15 to 18 and the electrical characteristics of Comparative Examples 10, a decrease in the non-dedoping capacity was promoted as a result of the heat-treatment of mixtures with the compounds B to E, and the efficiency was increased (Table 9).

Example 19

To 100 g of a palm shell char having a particle diameter of 2.360 to 0.850 mm (including 98% by mass of particles having a particle diameter of 2.360 to 0.850 mm), which was obtained by crushing and carbonizing palm shells at 500° C., a nitrogen gas including 1% by volume of hydrogen chloride gas was supplied at a flow rate of 10 liters/minute, and thereby the palm shell char was treated for 190 minutes at 1000° C. Subsequently, only the supply of the hydrogen chloride gas was stopped, and the palm shell char was further heat treated for 70 minutes. Thus, 85 g of a treatment product was obtained. This was subjected to crude pulverization with a ball mill up to a central particle diameter of 5 μm, and then pulverized with a compact jet mill (Co-Jet System α-mkIII) and classified. Thus, a pulverized palm shell char carbon precursor A was obtained.

To 100 g of the pulverized palm shell char carbon precursor A, toluene was vaporized and supplied at a flow rate of 3.9 g/minute while nitrogen gas was streamed at a rate of 1.1 liters/minute, and the system was allowed to react at 750° C. for 3 hours. Thereafter, only the supply of toluene was stopped, and the system was maintained at 1000° C. for 1 hour. Thus, a carbonaceous material 19 for a negative electrode of non-aqueous electrolyte secondary batteries was obtained.

Example 20

To 100 g of the pulverized palm shell char carbon precursor A produced in Example 1, toluene was vaporized and supplied at a flow rate of 3.9 g/minute while nitrogen gas was streamed at a rate of 1.1 liters/minute, and the system was allowed to react at 750° C. for 3 hours. Thereafter, only the supply of toluene was stopped, and the system was maintained at 1100° C. for 1 hour. Thus, a carbonaceous material 20 for negative electrode of non-aqueous electrolyte secondary batteries was obtained.

Example 21

To 100 g of a pulverized palm shell char carbon precursor A produced in the same manner as in Example 19 except that the palm shell char was pulverized with a compact jet mill (Co-Jet System α-mkIII) and classified to a central particle size of 10 μm, toluene was vaporized and supplied at a flow rate of 0.3 g/minute while nitrogen gas was streamed at a rate of 6.5 liters/minute, and the system was allowed to react at 750° C. for 4 hours. Thereafter, only the supply of toluene was stopped, and the system was maintained at 750° C. for 8 hours. Subsequently, the temperature was raised to 1100° C., and the system was maintained for 3 hours. Thus, a carbonaceous material 21 for negative electrode of non-aqueous electrolyte secondary batteries was obtained.

Example 22

To 100 g of a pulverized palm shell char carbon precursor A produced in the same manner as in Example 19 except that the palm shell char was pulverized with a compact jet mill (Co-Jet System α-mkIII) and classified to a central particle size of 10 μm, toluene was vaporized and supplied at a flow rate of 0.3 g/minute while nitrogen gas was streamed at a rate of 6.5 liters/minute, and the system was allowed to react at 750° C. for 12 hours. Thereafter, only the supply of toluene was stopped, and the system was maintained at 1100° C. for 3 hours. Thus, a carbonaceous material 22 for negative electrode of non-aqueous electrolyte secondary batteries was obtained.

Example 23

To 100 g of a pulverized palm shell char carbon precursor A produced in the same manner as in Example 19 except that the palm shell char was pulverized with a compact jet mill (Co-Jet System α-mkIII) and classified to a central particle size of 10 μm, ethylene was vaporized and supplied at a flow rate of 0.2 liters/minute while nitrogen gas was streamed at a rate of 6.5 liters/minute, and the system was allowed to react at 750° C. for 6 hours. Thereafter, only the supply of ethylene was stopped, and the system was maintained at 1100° C. for 3 hours. Thus, a carbonaceous material 23 for negative electrode of non-aqueous electrolyte secondary batteries was obtained.

Comparative Example 11

To 100 g of a palm shell char having a particle diameter of 2.360 to 0.850 mm (including 98% by mass of particles having a particle diameter of 2.360 to 0.850 mm), which was obtained by crushing and carbonizing palm shells at 500° C., nitrogen gas including 1% by volume of hydrogen chloride gas was supplied at a flow rate of 10 liters/minute, and the palm shell char was treated at 1000° C. for 190 minutes. Subsequently, only the supply of hydrogen chloride gas was stopped, and the palm shell char was further heat treated for 70 minutes. Thus, 85 g of a treatment product was obtained. This was subjected to crude pulverization with a ball mill to a central particle diameter of 5 μm, and then was pulverized with a compact jet mill (Co-Jet System α-mkIII) and classified. Thus, a pulverized palm shell char carbon precursor A was obtained.

Negative electrodes and non-aqueous electrolyte secondary batteries were produced using the carbonaceous materials obtained in Examples 19 to 23 and the pulverized palm shell carbon A obtained in Comparative Example 11. An evaluation of the electrode performance was carried out.
(Method for Producing Measurement Cell and Evaluation of Charge-discharge Capacities)

The carbonaceous materials of the present invention were suitable to be used in the negative electrodes of non-aqueous electrolyte secondary batteries; however, in order to accurately evaluate the charge capacity, discharge capacity and non-discharge capacity of the battery active materials, which are effects of the present invention, without being affected by fluctuations in the performance of the counter electrode, an evaluation of a lithium counter electrode was carried out. That is, lithium secondary batteries were produced to be configured to include lithium metal having stabilized characteristics as a negative electrode, and the carbonaceous materials obtained as described above as positive electrodes. Characteristics of the lithium secondary batteries were evaluated.

A positive electrode (carbon electrode) was produced as follows. N-methyl-2-pyrrolidone was added to 94 parts by weight of each of the carbonaceous materials produced in the Examples and 6 parts by weight of polyvinylidene fluoride to obtain a paste form, and this paste was uniformly applied on a copper foil having a size of 50×200 (mm) and dried at 80° C. for 30 minutes in an air atmosphere. Thereafter, the assembly was pressed with a roll pressing machine so as to obtain a porosity of 35% to 45%, and thus a positive electrode was produced. This positive electrode was punched into a disc having a diameter of 13 mm, and the positive electrode was degassed and dried in a glass tube oven at 170° C. for 10 h. A negative electrode (lithium electrode) was produced in a glove box in an Ar atmosphere, and a lithium metal sheet having a thickness of 0.3 mm that was punched into a disc having a diameter of 15 mm, was used as a negative electrode.

A 2032-sized coin type non-aqueous electrolyte lithium secondary battery was assembled in an Ar glove box using the positive electrode and negative electrode produced as such, using a product obtained by adding $LiPF_6$ at a proportion of 1 mole/liter to a mixed solvent prepared by mixing ethylene carbonate and diethyl carbonate at a volume ratio of 1:1, as a liquid electrolyte, using a polypropylene porous membrane as a separator, and using a gasket made of polypropylene.

A lithium secondary battery having such a configuration was subjected to doping and dedoping of lithium into the carbonaceous material, and the capacities thereof were determined. Doping was carried out by a constant current constant voltage method. Constant current charging was performed at a current density of 0.125 $mA/cm^2$ until the voltage reached 1 mV, and at the time point when the voltage reached 1 mV, the current value was decreased while the voltage remained constant. At the time point when the current value reached 20 μA, charging was terminated. The value obtained by dividing the amount of electricity in this case by the weight of the carbonaceous material used was defined as the charging capacity, and was expressed in the unit of mAh/g. Next, a current was passed in the same manner but in the opposite direction, and the lithium doped in the carbonaceous material was dedoped. Dedoping was carried out at a current density of 0.5 $mA/cm^2$, and the terminal voltage of 2.5 V was employed as the cut-off voltage. The amount of electricity in this case was defined as the discharging capacity, and was expressed in the unit of mAh/g. Subsequently, the irreversible capacity was determined as the difference between the charge capacity and the discharge capacity. The discharge efficiency (%) was determined by dividing the discharge capacity by the charge capacity, and multiplying the resultant value by 100. This is a value indicating how effectively the active material has been used. The measurement of the characteristics was carried out at 25° C.

TABLE 10

| | Gas | Average particle diameter (d50) μm | Specific surface area $m^2/g$ | Electrode thickness μm | Electrode density $g/cm^3$ | Charge capacity mAh/g | Discharge capacity mAh/g | Charge-discharge efficiencies % | Irreversible capacity mAh/g |
|---|---|---|---|---|---|---|---|---|---|
| Example 19 | Toluene | 6 | 11 | 117 | 0.93 | 640 | 502 | 78 | 138 |
| Example 20 | Toluene | 5 | 7 | 107 | 0.94 | 475 | 373 | 78 | 102 |
| Example 21 | Toluene | 10 | 8 | 130 | 0.91 | 489 | 382 | 78 | 107 |
| Example 22 | Toluene | 10 | 3 | 142 | 0.87 | 482 | 393 | 82 | 88 |
| Example 23 | Ethylene | 10 | 11 | 135 | 0.86 | 475 | 379 | 80 | 96 |

TABLE 10-continued

| | Gas | Average particle diameter (d50) μm | Specific surface area m²/g | Electrode thickness μm | Electrode density g/cm³ | Charge capacity mAh/g | Discharge capacity mAh/g | Charge-discharge efficiencies % | Irreversible capacity mAh/g |
|---|---|---|---|---|---|---|---|---|---|
| Comparative Example 11 | None | 5 | 118 | 84 | 1.02 | 514 | 351 | 68 | 164 |

In a comparison between the fundamental properties of the carbonaceous materials obtained in Examples 19 to 23 of the present invention and the fundamental properties of the carbonaceous material obtained in Comparative Example 11, the specific surface area was decreased as a result of heat-treatment in the presence of toluene or ethylene, and the coating films produced by hydrocarbon compounds exhibited an excellent effect of reducing the specific surface area (Table 10). Furthermore, in a comparison between the electrical characteristics of Examples 19 to 23 and the electrical characteristics of Comparative Example 11, the lithium-ion secondary batteries produced using the carbonaceous materials of Examples 19 to 23 had improved charge-discharge efficiency, and also had decreased irreversible capacities.

INDUSTRIAL APPLICABILITY

A non-aqueous electrolyte secondary battery produced using the carbonaceous material for negative electrode of the present invention exhibits an excellent dedoping capacity (discharge capacity), an excellent non-dedoping capacity (irreversible capacity), and excellent efficiency. Therefore, the non-aqueous electrolyte secondary battery can be used for the applications in vehicles such as hybrid vehicles (HEV's) and electric vehicles (EV's), which require long service lives and high input-output performances.

Accordingly, the present specification discloses

[1] a carbonaceous material for non-aqueous electrolyte secondary batteries, characterized in that the carbonaceous material is obtained by subjecting a plant-derived char demineralized in a gas-phase and a carbon precursor, to heat-treatment under a non-oxidizing gas atmosphere, and has a specific surface area determined by a BET method of 10 m²/g or less,

[2] the carbonaceous material for non-aqueous electrolyte secondary batteries of any one of the item [1], wherein an average (002) interlayer spacing d002 determined by x-ray diffractometry is 0.360 to 0.400 nm, and a true density determined by butanol method $\rho_{Bt}$ is 1.80 or less,

[3] the carbonaceous material for non-aqueous electrolyte secondary batteries of the item [1] or [2], wherein an amount of potassium contained therein is 0.1 weight % or less, and an amount of iron contained therein is 0.02 weight % or less,

[4] the carbonaceous material for non-aqueous electrolyte secondary batteries of any one of the items [1] to [3], wherein the heat-treatment is (a) final heat treatment at 800 to 1600° C., or (b) pre-heat-treatment at no less than 350° C. to less than 800° C., and final heat-treatment at 800 to 1600° C.,

[5] the carbonaceous material for non-aqueous electrolyte secondary batteries of any one of the items [1] to [4], wherein the demineralization treatment in a gas-phase is carried out by heating plant-derived char having an average particle diameter of 100 to 10000 μm at 500° C. to 1250° C. under an inert gas atmosphere containing a halogen compound,

[6] the carbonaceous material for non-aqueous electrolyte secondary batteries of any one of the items [1] to [5], wherein the carbon precursor is a non-graphitizable carbon precursor, a graphitizable carbon precursor, or a mixture thereof,

[7] a method for manufacturing a carbonaceous material for non-aqueous electrolyte secondary batteries comprising the following steps:
(1) mixing a plant-derived char demineralized in a gas-phase, and a carbon precursor, to obtain a mixture comprising the plant-derived char demineralized in a gas-phase and a carbon precursor of 93:7 to 45:55 in a ratio by weight, and
(2) subjecting the mixture to heat-treatment,

[8] the method for manufacturing a carbonaceous material for non-aqueous electrolyte secondary batteries of the item [7], wherein the heat-treatment is (a) final heat treatment at 800 to 1600° C., or (b) pre-heat-treatment at no less than 350° C. to less than 800° C., and final heat-treatment at 800 to 1600° C.,

[9] the method for manufacturing a carbonaceous material for non-aqueous electrolyte secondary batteries of the item [7] or [8], wherein the demineralization treatment in a gas-phase is carried out by heating plant-derived char having an average particle diameter of 100 to 10000 μm at 500° C. to 1250° C. under an inert gas atmosphere containing a halogen compound,

[10] a negative electrode for non-aqueous electrolyte secondary batteries comprising the carbonaceous material of any one of the items [1] to [6], or

[11] a non-aqueous electrolyte secondary battery comprising the negative electrode of the item [10],

[12] the carbonaceous material for non-aqueous electrolyte secondary batteries any one of the items [1] to [6], wherein particles having a particle diameter of 1 μm or less are 3.0 volume % or less, or

[13] the method for manufacturing a carbonaceous material for a negative electrode of non-aqueous electrolyte secondary batteries of any one of the item [7] to [9], further compris a step of removing particles having a particle diameter of 1 μm or less so that the volume thereof became 3 volume % or less.

Accordingly, the present specification discloses

[1] a carbonaceous material for non-aqueous electrolyte secondary batteries, characterized in that the carbonaceous material is obtained by subjecting a plant-derived char demineralized in a gas-phase and a graphitizable carbon precursor, to heat-treatment under a non-oxidizing gas atmosphere, and has a specific surface area determined by a BET method of 10 m²/g or less,

[2] the carbonaceous material for non-aqueous electrolyte secondary batteries of the item [1], wherein an average (002) interlayer spacing d002 determined by x-ray diffractometry is 0.360 to 0.400 nm, and a true density determined by butanol method $\rho_{Bt}$ is 1.70 or less,

[3] the carbonaceous material for non-aqueous electrolyte secondary batteries of the item [1] or [2], wherein an amount of potassium contained therein is 0.1 weight % or less, and an amount of iron contained therein is 0.02 weight % or less,

[4] the carbonaceous material for non-aqueous electrolyte secondary batteries of any one of the items [1] to [3], wherein the heat-treatment is (a) final heat treatment at 800 to 1600° C., or (b) pre-heat-treatment at no less than 350° C. to less than 800° C., and final heat-treatment at 800 to 1600° C.,

[5] the carbonaceous material for non-aqueous electrolyte secondary batteries of any one of the items [1] to [4], wherein the demineralization treatment in a gas-phase is carried out by heating plant-derived char having an average particle diameter of 100 to 10000 μm at 500° C. to 1250° C. under an inert gas atmosphere containing a halogen compound,

[6] the carbonaceous material for non-aqueous electrolyte secondary batteries of any one of the items [1] to [5], wherein the graphitizable carbon precursor is at least one selected from the group consisting of pitch and a polymer,

[7] a method for manufacturing a carbonaceous material for non-aqueous electrolyte secondary batteries comprising the following steps:
(1) mixing a plant-derived char demineralized in a gas-phase, and a graphitizable carbon precursor, to obtain a mixture comprising the plant-derived char demineralized in a gas-phase and a graphitizable carbon precursor of 96.5:3.5 to 40:60 in a ratio by weight, and (2) subjecting the mixture to heat-treatment.

[8] the method for manufacturing a carbonaceous material for non-aqueous electrolyte secondary batteries of the item [7], wherein the heat-treatment is (a) final heat treatment at 800 to 1600° C., or (b) pre-heat-treatment at no less than 350° C. to less than 800° C., and final heat-treatment at 800 to 1600° C.,

[9] the method for manufacturing a carbonaceous material for non-aqueous electrolyte secondary batteries of the item [7] or [8], wherein the demineralization treatment in a gas-phase is carried out by heating plant-derived char having an average particle diameter of 100 to 10000 μm at 500° C. to 1250° C. under an inert gas atmosphere containing a halogen compound,

[10] a negative electrode for non-aqueous electrolyte secondary batteries comprising the carbonaceous material of any one of the items [1] to [6], or

[11] a non-aqueous electrolyte secondary battery comprising the negative electrode of the item [10],

[12] the carbonaceous material for non-aqueous electrolyte secondary batteries any one of the items [1] to [6], wherein particles having a particle diameter of 1 μm or less are 3.0 volume % or less, or

[13] the method for manufacturing a carbonaceous material for a negative electrode of non-aqueous electrolyte secondary batteries of any one of the item [7] to [9], further compris a step of removing particles having a particle diameter of 1 μm or less so that the volume thereof became 3 volume % or less.

Accordingly, the present specification discloses

[1] a carbonaceous material for non-aqueous electrolyte secondary batteries, characterized in that the carbonaceous material is obtained by subjecting a plant-derived char demineralized in a gas-phase and a volatile organic compound which has an actual carbon ratio of less than 5 weight % in an ignition treatment at 800° C., and is solid at ordinary temperature, to heat-treatment under a non-oxidizing gas atmosphere, and has a specific surface area determined by a BET method of 10 m$^2$/g or less,

[2] the carbonaceous material for non-aqueous electrolyte secondary batteries of the item [1], wherein an amount of potassium contained therein is 0.1 weight % or less, and an amount of iron contained therein is 0.02 weight % or less,

[3] the carbonaceous material for non-aqueous electrolyte secondary batteries of the item [1] or [3], wherein the heat-treatment is (a) final heat treatment at 800 to 1600° C., or (b) pre-heat-treatment at no less than 350° C. to less than 800° C., and final heat-treatment at 800 to 1600° C.,

[4] the carbonaceous material for non-aqueous electrolyte secondary batteries of any one of the items [1] to [3], wherein the demineralization treatment in a gas-phase is carried out by heating plant-derived char having an average particle diameter of 100 to 10000 μm at 500° C. to 1250° C. under an inert gas atmosphere containing a halogen compound,

[5] the carbonaceous material for non-aqueous electrolyte secondary batteries of any one of the items [1] to [4], wherein the volatile organic compound is thermoplastic resin or a low-molecular organic compound,

[6] the carbonaceous material for non-aqueous electrolyte secondary batteries of any one of the items [1] to [5], wherein the volatile organic compound is at least one selected from the group consisting of polystyrene, polyethylene, polypropylene, poly(meth)acrylic acid, poly(meth)acrylic acid ester, naphthalene, phenanthrene, anthracene, and pyrene,

[7] a method for manufacturing a carbonaceous material for non-aqueous electrolyte secondary batteries comprising the following steps:
(1) mixing a plant-derived char demineralized in a gas-phase, and a volatile organic compound which has an actual carbon ratio of less than 5 weight % in an ignition treatment at 800° C., and is solid at ordinary temperature, to obtain a mixture comprising the plant-derived char demineralized in a gas-phase and a graphitizable carbon precursor of 97:3 to 40:60 in a ratio by weight, and
(2) subjecting the mixture to heat-treatment.

[8] the method for manufacturing a carbonaceous material for non-aqueous electrolyte secondary batteries of the item [7], wherein the heat-treatment is (a) final heat treatment at 800 to 1600° C., or (b) pre-heat-treatment at no less than 350° C. to less than 800° C., and final heat-treatment at 800 to 1600° C.,

[9] the method for manufacturing a carbonaceous material for non-aqueous electrolyte secondary batteries of the item [7] or [8], wherein the demineralization treatment in a gas-phase is carried out by heating plant-derived char having an average particle diameter of 100 to 10000 μm at 500° C. to 1250° C. under an inert gas atmosphere containing a halogen compound,

[10] a negative electrode for non-aqueous electrolyte secondary batteries comprising the carbonaceous material of any one of the items [1] to [6], or

[11] a non-aqueous electrolyte secondary battery comprising the negative electrode of the item [10],

[12] the carbonaceous material for non-aqueous electrolyte secondary batteries any one of the items [1] to [6], wherein particles having a particle diameter of 1 μm or less are 3.0 volume % or less, or

[13] the method for manufacturing a carbonaceous material for a negative electrode of non-aqueous electrolyte secondary batteries of any one of the item [7] to [9], further compris a step of removing particles having a particle diameter of 1 μm or less so that the volume thereof became 3 volume % or less.

Accordingly, the present specification discloses

[1] a carbonaceous material for non-aqueous electrolyte secondary batteries, characterized in that the carbonaceous material is obtained by subjecting a plant-derived char demineralized in a gas-phase to heat-treatment at 600 to 1000° C. in a non-oxidizing gas atmosphere containing a vaporized hydrocarbon compound having 1 to 20 carbon atoms, and subjecting the obtained plant-derived char to heat treatment at 800 to 1600° C. in a non-oxidizing gas atmosphere; and has a specific surface area determined by a BET method of 15 m$^2$/g or less,

[2] the carbonaceous material for non-aqueous electrolyte secondary batteries of the item [1], wherein an amount of potassium contained therein is 0.1 weight % or less, and an amount of iron contained therein is 0.02 weight % or less,

[3] the carbonaceous material for non-aqueous electrolyte secondary batteries of the item [1] or [2], wherein the demineralization treatment in a gas-phase is carried out by heating plant-derived char having an average particle diameter of 100 to 10000 μm at 500° C. to 1250° C. under an inert gas atmosphere containing a halogen compound,

[4] the carbonaceous material for non-aqueous electrolyte secondary batteries of any one of the items [1] to [3], wherein the hydrocarbon compound is an unsubstituted or substituted hydrocarbon compound having 1 to 20 carbon atoms,

[5] the carbonaceous material for non-aqueous electrolyte secondary batteries of any one of the items [1] to [4], wherein the hydrocarbon compound is at least one selected from the group consisting of methane, ethane, ethylene, propylene, benzene, and toluene,

[6] a method for manufacturing a carbonaceous material for a negative electrode of non-aqueous electrolyte secondary batteries comprising the following steps:
(1) subjecting a plant-derived char demineralized in a gas-phase to heat treatment at 600 to 1000° C. in a non-oxidizing gas atmosphere containing a vaporized hydrocarbon compound having 1 to 20 carbon atoms or vaporized heterocyclic compound having 1 to 20 carbon atoms, and
(2) subjecting the obtained plant-derived char to heat-treatment at 800 to 1600° C. in a non-oxidizing gas atmosphere,

[7] the carbonaceous material for non-aqueous electrolyte secondary batteries of the item [6], wherein the demineralization treatment in a gas-phase is carried out by heating plant-derived char having an average particle diameter of 100 to 10000 μm at 500° C. to 1250° C. under an inert gas atmosphere containing a halogen compound,

[8] a negative electrode for non-aqueous electrolyte secondary batteries comprising the carbonaceous material of any one of the items [1] to [5], or

[9] a non-aqueous electrolyte secondary battery comprising the negative electrode of the item [8].

The invention claimed is:

1. A method for manufacturing a carbonaceous material for a negative electrode of non-aqueous electrolyte secondary batteries comprising the following steps:
   (1) subjecting a plant-derived char having an average particle diameter of 100 to 10,000 μm to a heat treatment in an inert gas atmosphere containing a hydrogen chloride at 500° C. to 1250° C. to demineralize the plant-derived char in a gas-phase;
   (2) mixing 35 weight % or more of the plant-derived char demineralized in a gas-phase, and an organic compound which contains a volatile-element of 10 weight % or more in an ignition treatment at 800° C., to obtain a mixture comprising them, and
   (3) subjecting the mixture to final heat-treatment at 800 to 1600° C. under a non-oxidizing gas atmosphere; or pre-heat-treatment at no less than 350° C. to less than 800° C., and final heat-treatment at 800 to 1600° C. under a non-oxidizing gas atmosphere, so as to obtain the carbonaceous material having a specific surface area determined by a BET method of 10 m$^2$/g or less and the amount of potassium is 0.05 weight % or less, and the amount of iron is 0.02 weight % or less.

2. The method for manufacturing a carbonaceous material for a negative electrode of non-aqueous electrolyte secondary batteries according to claim 1, wherein the organic compound is a carbon precursor, and the mixture comprising the plant-derived char demineralized in a gas-phase and a carbon precursor of 95:5 to 45:55 in a ratio by weight is obtained in the mixing step (2).

3. The method for manufacturing a carbonaceous material for a negative electrode of non-aqueous electrolyte secondary batteries according to claim 2, wherein the carbon precursor is a non-graphitizable carbon precursor, graphitizable carbon precursor, or mixture thereof.

4. The method for manufacturing a carbonaceous material for a negative electrode of non-aqueous electrolyte secondary batteries according to claim 3, wherein the non-graphitizable carbon precursor is at least one selected from the group consisting of infusible pitch or tar, themiosetting resins, infusible thermoplastic resins, or plant-derived organic substances.

5. The method for manufacturing a carbonaceous material for a negative electrode of non-aqueous electrolyte secondary batteries according to claim 3, wherein the graphitizable carbon precursor is at least one selected from the group consisting of pitch and a polymer.

6. The method for manufacturing a carbonaceous material for a negative electrode of non-aqueous electrolyte secondary batteries according to claim 1, wherein the organic compound is a graphitizable carbon precursor or a mixture of non-graphitizable carbon precursor and graphitizable carbon precursor, and
   the mixture comprising the plant-derived char demineralized in a gas-phase and the carbon precursor (the graphitizable carbon precursor or the mixture of non-graphitizable carbon precursor and graphitizable carbon precursor) of 95:5 to 42.5:57.5 in a ratio by weight is obtained in the mixing step (2).

7. The method for manufacturing a carbonaceous material for a negative electrode of non-aqueous electrolyte secondary batteries according to claim 1, wherein the organic compound is a graphitizable carbon precursor, and the mixture comprising the plant-derived char demineralized in a gas-phase and the graphitizable carbon precursor of 96.5:3.5 to 40:60 in a ratio by weight is obtained in the mixing step (2).

8. The method for manufacturing a carbonaceous material for a negative electrode of non-aqueous electrolyte secondary batteries according to claim 1, wherein the organic compound is a volatile organic compound which has an actual carbon ratio of less than 5 weight % in an ignition treatment at 800° C., and is solid at ordinary temperature; and the mixture comprising the plant-derived char demineralized in a gas-phase and the volatile organic compound (which has an actual carbon ratio of less than 5 weight % in an ignition treatment at 800° C., and is solid at ordinary temperature) of 97:3 to 40:60 in a ratio by weight is obtained in the mixing step (2).

9. The method for manufacturing a carbonaceous material for a negative electrode of non-aqueous electrolyte secondary batteries according to claim 8, wherein the volatile organic compound is thermoplastic resin or a low-molecular organic compound.

10. The method for manufacturing a carbonaceous material for a negative electrode of non-aqueous electrolyte secondary batteries according to claim 8, wherein the volatile organic compound is at least one selected from the group consisting of polystyrene, polyethylene, polypropylene, poly(meth)acrylic acid, poly(meth)acrylic acid ester, naphthalene, phenanthrene, anthracene, and pyrene.

* * * * *